(12) United States Patent
Kim

(10) Patent No.: US 11,366,733 B2
(45) Date of Patent: Jun. 21, 2022

(54) MEMORY SYSTEM AND METHOD OF CONTROLLING TEMPERATURE THEREOF

(71) Applicant: SK hynix Inc., Gyeonggi-do (KR)

(72) Inventor: Byung-Jun Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 40 days.

(21) Appl. No.: 16/837,764

(22) Filed: Apr. 1, 2020

(65) Prior Publication Data

US 2021/0026748 A1    Jan. 28, 2021

(30) Foreign Application Priority Data

Jul. 22, 2019  (KR) ........................ 10-2019-0088353

(51) Int. Cl.
| | |
|---|---|
| *G06F 12/00* | (2006.01) |
| *G06F 11/30* | (2006.01) |
| *G06F 12/0873* | (2016.01) |
| *G06F 11/34* | (2006.01) |

(52) U.S. Cl.
CPC ...... *G06F 11/3037* (2013.01); *G06F 11/3058* (2013.01); *G06F 11/3466* (2013.01); *G06F 12/0873* (2013.01); *G06F 2212/7201* (2013.01)

(58) Field of Classification Search
CPC .......................... G06F 12/0246; G06F 3/0679
See application file for complete search history.

(56) References Cited

U.S. PATENT DOCUMENTS

| | | |
|---|---|---|
| 5,740,465 A | 4/1998 | Matsunami et al. |
| 6,553,511 B1 | 4/2003 | DeKoning et al. |
| 6,996,676 B2 | 2/2006 | Megiddo et al. |
| 7,549,034 B2 | 6/2009 | Foster, Sr. et al. |
| 7,613,877 B2 | 11/2009 | Shimozono et al. |
| 7,856,530 B1 | 12/2010 | Mu |
| 8,972,957 B2 | 3/2015 | Bates et al. |
| 9,003,126 B2 | 4/2015 | Cai et al. |
| 9,104,599 B2 | 8/2015 | Atkisson et al. |
| 9,329,846 B1 | 5/2016 | August et al. |
| 9,378,135 B2 | 6/2016 | Bennett |

(Continued)

FOREIGN PATENT DOCUMENTS

| | | |
|---|---|---|
| KR | 10-2017-0006427 A | 1/2017 |
| KR | 10-2017-0081126 A | 7/2017 |

OTHER PUBLICATIONS

Notice of Allowance issued by the USPTO for U.S. Appl. No. 16/717,144 dated Jun. 10, 2021.

(Continued)

*Primary Examiner* — Daniel D Tsui
(74) *Attorney, Agent, or Firm* — IP & T Group LLP

(57) ABSTRACT

A method for controlling temperature of a memory system which includes a memory device suitable for storing memory map data including a logical address of an external device and a physical address of a memory device, corresponding to the logical address; and a controller suitable for downloading at least a part of the memory map data and storing and managing the downloaded data as controller map data, and uploading at least a part of the controller map data to the external device, the method comprising: measuring temperature of the memory device; and performing a map downloading for the memory map data from the memory device in response to the measured temperature.

30 Claims, 21 Drawing Sheets

(56) References Cited

U.S. PATENT DOCUMENTS

| | | |
|---|---|---|
| 9,400,749 B1 | 7/2016 | Kuzmin et al. |
| 9,703,664 B1 | 7/2017 | Alshawabkeh et al. |
| 10,268,584 B2 | 4/2019 | Hahn |
| 10,783,071 B2 | 9/2020 | Wang et al. |
| 2003/0041212 A1 | 2/2003 | Creta et al. |
| 2005/0102297 A1 | 5/2005 | Lloyd et al. |
| 2007/0118695 A1 | 5/2007 | Lowe et al. |
| 2007/0220201 A1 | 9/2007 | Gill et al. |
| 2009/0125548 A1 | 5/2009 | Moir et al. |
| 2010/0088467 A1 | 4/2010 | Lee et al. |
| 2011/0093648 A1 | 4/2011 | Belluomini et al. |
| 2012/0096225 A1 | 4/2012 | Khawand et al. |
| 2012/0124294 A1 | 5/2012 | Atkisson et al. |
| 2013/0124794 A1 | 5/2013 | Bux et al. |
| 2013/0151777 A1 | 6/2013 | Daly et al. |
| 2013/0151778 A1 | 6/2013 | Daly et al. |
| 2013/0151780 A1 | 6/2013 | Daly et al. |
| 2014/0047170 A1 | 2/2014 | Cohen et al. |
| 2014/0173234 A1 | 6/2014 | Jung et al. |
| 2014/0258638 A1 | 9/2014 | Traut et al. |
| 2015/0301744 A1 | 10/2015 | Kim et al. |
| 2015/0347028 A1 | 12/2015 | Kotte et al. |
| 2015/0356020 A1 | 12/2015 | Desai et al. |
| 2015/0378925 A1 | 12/2015 | Misra |
| 2016/0147654 A1 | 5/2016 | Zhao et al. |
| 2016/0267018 A1 | 9/2016 | Shimizu et al. |
| 2016/0274797 A1 | 9/2016 | Hahn |
| 2016/0299715 A1 | 10/2016 | Hashimoto et al. |
| 2016/0371024 A1 | 12/2016 | Park et al. |
| 2016/0378359 A1 | 12/2016 | Jang et al. |
| 2017/0060202 A1* | 3/2017 | Sundaram ............. G06F 1/3275 |
| 2017/0109089 A1 | 4/2017 | Huang |
| 2017/0192902 A1* | 7/2017 | Hwang ............... G06F 12/0246 |
| 2017/0351452 A1 | 12/2017 | Boyd et al. |
| 2018/0067678 A1* | 3/2018 | Jeong ................... G06F 3/0634 |
| 2018/0088812 A1 | 3/2018 | Lee |
| 2018/0101477 A1 | 4/2018 | Kan et al. |
| 2018/0121121 A1 | 5/2018 | Mehra et al. |
| 2019/0004591 A1 | 1/2019 | Park et al. |
| 2019/0004944 A1 | 1/2019 | Widder et al. |
| 2019/0042464 A1 | 2/2019 | Genshaft et al. |
| 2019/0171575 A1 | 6/2019 | Chen et al. |
| 2019/0265976 A1 | 8/2019 | Goryavskiy et al. |
| 2019/0266079 A1 | 8/2019 | R et al. |
| 2019/0272104 A1 | 9/2019 | Durnov et al. |
| 2019/0294546 A1 | 9/2019 | Agarwal et al. |
| 2020/0151108 A1 | 5/2020 | Yen et al. |
| 2020/0278797 A1 | 9/2020 | Bavishi |
| 2020/0327063 A1 | 10/2020 | Kang et al. |
| 2020/0334138 A1 | 10/2020 | Byun |
| 2020/0334166 A1 | 10/2020 | Byun et al. |

OTHER PUBLICATIONS

Differences between disk cache write-through and write-back, Huawei Enterprise Support Community, Jun. 6, 2016 <https://forum.huawei.com/enterprise/en/differences-between-disk-cache-write-through-and-write-back/thread/203781-891>.

Office Action issued by the USPTO for U.S. Appl. No. 16/709,702 dated Apr. 6, 2021.

Cai Y, et al., Error characterization, mitigation, and recovery in flash-memory-based solid-state drives, Sep. 2017, pp. 1666-1704, vol. 105, Proceedings of the IEEE.

Office Action issued by the USPTO for U.S. Appl. No. 16/842,416 dated May 3, 2021.

Office Action issued by the USPTO for U.S. Appl. No. 16/709,702 dated Oct. 14, 2021.

Office Action issued by the USPTO for U.S. Appl. No. 16/837,727 dated Oct. 7, 2021.

Notice of Allowance issued by the USPTO dated Mar. 4, 2022.

Office Action issued by the USPTO dated Apr. 26, 2022.

Office Action issued by the USPTO dated May 13, 2022.

* cited by examiner

FIG. 2B

| L2P_MAP_C ||| D_INF |
| L2P_MS | LA | PA | |
|---|---|---|---|
| 5 | 5120 ~ 6143 | 1 ~ 1024 | 0 |
| 6 | 6144 ~ 7167 | 1025 ~ 2048 | 1 |
| 7 | 7168 ~ 8191 | 2049 ~ 3072 | 1 |
| 8 | 8192 ~ 9215 | 3073 ~ 4096 | 1 |
| 9 | 9216 ~ 10239 | 4097 ~ 5120 | 1 |
| 10 | 10240 ~ 11263 | 5121 ~ 6144 | 1 |
| 11 | 11264 ~ 12287 | 6145 ~ 7168 | 0 |
| 12 | 12288 ~ 13311 | 7169 ~ 8182 | 1 |
| 13 | 13312 ~ 14335 | 8193 ~ 9216 | 1 |
| 14 | 14336 ~ 15359 | 9217 ~ 10240 | 1 |

FIG. 4A

| L2P_MS | L2P_MAP_C ||||| EN |
|---|---|---|---|---|---|---|
| | LA || | PA || |
| 5 | 5120 | ~ | 6143 | 1 | ~ | 1024 | 0 |
| 6 | 6144 | ~ | 7167 | 1024 | ~ | 2048 | 0 |
| 7 | 7168 | ~ | 8191 | 2049 | ~ | 3072 | 0 |
| 8 | 8192 | ~ | 9215 | 3073 | ~ | 4096 | 0 |
| 9 | 9216 | ~ | 10239 | 4097 | ~ | 5120 | 0 |
| 10 | 10240 | ~ | 11263 | 5121 | ~ | 6144 | 0 |
| 11 | 11264 | ~ | 12287 | 6145 | ~ | 7168 | 0 |
| 12 | 12288 | ~ | 13311 | 7169 | ~ | 8192 | 0 |
| 13 | 13312 | ~ | 14335 | 8193 | ~ | 9216 | 0 |
| 14 | 14336 | ~ | 15359 | 9217 | ~ | 10240 | 0 |

FIG. 4B

| L2P_MS | L2P_MAP_H | | | | | | EN |
|---|---|---|---|---|---|---|---|
| | LA | | | PA | | | |
| 0 | 0 | ~ | 1023 | 10000 | ~ | 11023 | 1 |
| 1 | 1024 | ~ | 2047 | 11024 | ~ | 12047 | 1 |
| 2 | 2048 | ~ | 3071 | 12048 | ~ | 13071 | 1 |
| 3 | 3072 | ~ | 4095 | 13072 | ~ | 14095 | 1 |
| 4 | 4096 | ~ | 5119 | 14096 | ~ | 15119 | 1 |
| 5 | 5120 | ~ | 6143 | 1 | ~ | 1024 | 0 |
| 6 | 6144 | ~ | 7167 | 1024 | ~ | 2048 | 0 |
| 7 | 7168 | ~ | 8191 | 2049 | ~ | 3072 | 0 |
| 8 | 8192 | ~ | 9215 | 3073 | ~ | 4096 | 0 |
| 9 | 9216 | ~ | 10239 | 4097 | ~ | 5120 | 0 |
| 10 | 10240 | ~ | 11263 | 5121 | ~ | 6144 | 0 |
| 11 | 11264 | ~ | 12287 | 6145 | ~ | 7168 | 0 |
| 12 | 12288 | ~ | 13311 | 7169 | ~ | 8192 | 0 |
| 13 | 13312 | ~ | 14335 | 8193 | ~ | 9216 | 0 |
| 14 | 14336 | ~ | 15359 | 9217 | ~ | 10240 | 0 |
| ⋮ | ⋮ | | ⋮ | | | | 1 |
| ⋮ | ⋮ | | ⋮ | | | | 1 |
| n | 1024n | | 1024(n+1)-1 | | | | 1 |

FIG. 4C

| L2P_MS | L2P_MAP_C | | | | | | EN |
|---|---|---|---|---|---|---|---|
| | LA | | | PA | | | |
| 5 | 5120 | ~ | 6143 | 1 | ~ | 1024 | 1 |
| 6 | 6144 | ~ | 7167 | 1024 | ~ | 2048 | 1 |
| 7 | 7168 | ~ | 8191 | 2049 | ~ | 3072 | 1 |
| 8 | 8192 | ~ | 9215 | 3073 | ~ | 4096 | 1 |
| 9 | 9216 | ~ | 10239 | 4097 | ~ | 5120 | 1 |
| 10 | 10240 | ~ | 11263 | 5121 | ~ | 6144 | 1 |
| 11 | 11264 | ~ | 12287 | 6145 | ~ | 7168 | 1 |
| 12 | 12288 | ~ | 13311 | 7169 | ~ | 8192 | 1 |
| 13 | 13312 | ~ | 14335 | 8193 | ~ | 9216 | 1 |
| 14 | 14336 | ~ | 15359 | 9217 | ~ | 10240 | 1 |

FIG. 4D

| L2P_MS | L2P_MAP_H ||||| EN |
|---|---|---|---|---|---|---|
|  | LA ||| PA ||  |
| 0 | 0 | ~ | 1023 | 10000 | ~ | 11023 | 1 |
| 1 | 1024 | ~ | 2047 | 11024 | ~ | 12047 | 1 |
| 2 | 2048 | ~ | 3071 | 12048 | ~ | 13071 | 1 |
| 3 | 3072 | ~ | 4095 | 13072 | ~ | 14095 | 1 |
| 4 | 4096 | ~ | 5119 | 14096 | ~ | 15119 | 1 |
| 5 | 5120 | ~ | 6143 | 1 | ~ | 1024 | 1 |
| 6 | 6144 | ~ | 7167 | 1024 | ~ | 2048 | 1 |
| 7 | 7168 | ~ | 8191 | 2049 | ~ | 3072 | 1 |
| 8 | 8192 | ~ | 9215 | 3073 | ~ | 4096 | 1 |
| 9 | 9216 | ~ | 10239 | 4097 | ~ | 5120 | 1 |
| 10 | 10240 | ~ | 11263 | 5121 | ~ | 6144 | 1 |
| 11 | 11264 | ~ | 12287 | 6145 | ~ | 7168 | 1 |
| 12 | 12288 | ~ | 13311 | 7169 | ~ | 8192 | 1 |
| 13 | 13312 | ~ | 14335 | 8193 | ~ | 9216 | 1 |
| 14 | 14336 | ~ | 15359 | 9217 | ~ | 10240 | 1 |
| ⋮ | ⋮ |  | ⋮ |  |  |  | 1 |
| ⋮ | ⋮ |  | ⋮ |  |  |  | 1 |
| n | 1024n |  | 1024(n+1)-1 |  |  |  | 1 |

FIG. 11B

| L2P_MAP_C | | | T_INF |
|---|---|---|---|
| L2P_MS | LA | PA | |
| 5 | 5120 ~ 6143 | 1 ~ 1024 | 5 |
| 6 | 6144 ~ 7167 | 1025 ~ 2048 | 7 |
| 7 | 7168 ~ 8191 | 2049 ~ 3072 | 12 |
| 8 | 8192 ~ 9215 | 3073 ~ 4096 | 16 |
| 9 | 9216 ~ 10239 | 4097 ~ 5120 | 20 |
| 10 | 10240 ~ 11263 | 5121 ~ 6144 | 29 |
| 11 | 11264 ~ 12287 | 6145 ~ 7168 | 35 |
| 12 | 12288 ~ 13311 | 7169 ~ 8182 | 40 |
| 13 | 13312 ~ 14335 | 8193 ~ 9216 | 47 |
| 14 | 14336 ~ 15359 | 9217 ~ 10240 | 53 |

MEMORY SYSTEM AND METHOD OF CONTROLLING TEMPERATURE THEREOF

CROSS-REFERENCE TO RELATED APPLICATION

This application claims priority under 35 U.S.C. § 119 to Korean Patent Application No. 10-2019-0088353, filed on Jul. 22, 2019, which is incorporated herein by reference in its entirety.

BACKGROUND

1. Field

Various embodiments relate to a memory system including a memory device and a controller, and more particularly, to a memory system and a method for controlling temperature thereof.

2. Discussion of the Related Art

Recently, the paradigm for a computing environment has shifted to ubiquitous computing, which enables computer systems to be accessed anytime and everywhere. As a result, the use of portable electronic devices, such as mobile phones, digital cameras, notebook computers and the like, are rapidly increasing. Such portable electronic devices typically use or include a memory system that uses or embeds at least one memory device, i.e., a data storage device. The data storage device can be used as a main storage device or an auxiliary storage device of a portable electronic device.

Unlike a hard disk, a data storage device using a nonvolatile semiconductor memory device is advantageous in that it has excellent stability and durability because it has no mechanical driving part (e.g., a mechanical arm), and has high data access speed and low power consumption. In the context of a memory system having such advantages, an exemplary data storage device includes a USB (Universal Serial Bus) memory device, a memory card having various interfaces, a solid state drive (SSD) or the like.

SUMMARY

Various embodiments are directed to a memory system which can differently set a performance condition of a map downloading or map uploading under a specific temperature condition within the memory system, and maintain the temperature thereof in a preset range by controlling the performance of the map downloading or the map uploading according to the set performance condition, thereby improving the reliability of data storage and input/output operations, and a method for driving the same.

Also, various embodiments are directed to a device or method which can decide whether to perform a map downloading or map uploading in response to an operation environment, thereby maintaining the lifetime of the memory system or improving data stability or element stability.

According to an embodiment of the present invention, a method for controlling temperature of a memory system which includes a memory device suitable for storing memory map data including a logical address of an external device and a physical address of the memory device, the physical address corresponding to the logical address; and a controller suitable for storing at least a part of the memory map data as controller map data, and performing a map upload on at least a part of the controller map data as host map data to the external device, the method comprising: measuring the temperature of the memory device; and performing a map download for the memory map data from the memory device according to the measured temperature.

The map download may be performed in response to the measured temperature. The performing of the map download may comprise: performing the map download according to a first condition of performance conditions, when the measured temperature may be within a normal operation temperature range of the memory system; performing the map download according to a second condition of the performance conditions, when the measured temperature may be within a low temperature range lower than the normal operation temperature range; or performing the map download according to a third condition of the performance conditions, when the measured temperature may be within a high temperature range higher than the normal operation temperature range. The map download may be performed according to the second condition such that a number of downloads of the memory map data during the map download according to the second condition may be greater than a number of downloads of the memory map data during the map download according to the first condition. The map download may be performed according to the third condition such that a number of downloads of the memory map data during the map download according to the third condition may be smaller than a number of downloads of the memory map data during the map download according to the first condition. The map download may be performed according to the second condition such that duration of the map download according to the second condition may be greater than duration of the map download according to the first condition. The map download may be performed according to the third condition such that duration of the map download according to the third condition may be shorter than duration of the map download according to the first condition. The map download may be performed according to the second condition such that heat generated during the map download according to the second condition may be greater than heat generated during the map download according to the first condition. The map download may be performed according to the third condition such that heat generated during the map download according to the third condition may be smaller than heat generated during the map download according to the first condition. The method may further comprise, after performing the map download according to the second condition: remeasuring the temperature of the memory device; and uploading at least a part of the controller map data to the external device, when the remeasured temperature may be within the low temperature range. The method may further comprise: receiving a command, a first logical address, and a first physical address, which may be mapped to the first logical address within the host map data, from the external device; updating the controller map data by performing the map download according to the second condition, when the measured temperature may be within the low temperature range; searching the updated controller map data for a physical address, which may be mapped to the first logical address, and acquiring the physical address as a second physical address from the updated controller map data; and performing a command operation corresponding to the command on the second physical address. The method may further comprise: receiving a command, a first logical address, and a first physical address corresponding to the first logical address from the external device; determining whether the first physical address may be valid, when the measured temperature may be not within the low temperature range; and performing a command operation corresponding to the command on the first physical address, when the first physical address may be valid. The method may further comprise disabling a part of the host map data corresponding to the controller map data, and the controller map data, when the measured temperature may be lower than the lowest temperature of a normal operation temperature range of the memory system. The method may further comprise: receiving a command and a first logical address from the external device, after disabling the host map data and the controller map data; updating the controller map data by performing the map download; searching the updated controller map data for a physical address corresponding to the first logical address, and acquiring the physical address as a second physical address from the updated controller map data; and performing a command operation corresponding to the command on the acquired second physical address. The method may further comprise enabling the host map data and the controller map data, when the measured temperature may be higher than the lowest temperature of a normal operation temperature range of the memory system. The method may further comprise: receiving a command, a first logical address, and a first physical address corresponding to the first logical address from the external device, after the enabling of the host map data and the controller map data; updating the controller map data by performing the map download when the first physical address may be invalid; searching the updated controller map data for a physical address corresponding to the first logical address, and acquiring the physical address as a second physical address from the updated controller map data; and performing a command operation corresponding to the command on the acquired second physical address.

According to an embodiment of the present invention, a memory system comprising: a memory device suitable for storing memory map data including a logical address of an external device and a physical address of a memory device, the physical address corresponding to the logical address; a temperature sensor suitable for measuring temperature of the memory device; and a controller suitable for performing a map download, according to the measured temperature, on at least a part of the memory map data, and storing and managing the downloaded memory map data as controller map data, and performing a map upload on at least a part of the controller map data as host map data to the external device.

The controller performs the map download in response to the measured temperature. The controller performs the map download according to a first condition of performance conditions when the measured temperature may be within a normal operation temperature range of the memory system. The controller performs the map download according to a second condition of the performance conditions when the measured temperature may be lower than the normal operating temperature range, and the controller performs the map download according to a third condition of the performance conditions when the measured temperature may be higher than the normal operating temperature range. The controller performs the map download according to the second condition such that the number of downloads of the memory map data during the map download according to the second condition may be greater than the number of downloads of the memory map data during the map download according to the first condition. The controller performs the map download according to the third condition such that the number of downloads of the memory map data during the map download according to the third condition may be smaller than the number of downloads of the memory map data during the map download according to the first condition. The controller performs the map download according to the second condition such that duration of the map download according to the second condition may be greater than duration of the map download according to the first condition. The controller performs the map download according to the third condition such that duration of the map download according to the third condition may be shorter than duration of the map download according to the first condition. The controller performs the map download according to the second condition such that heat generated during the map download according to the second condition may be greater than heat generated during the map download according to the first condition. The controller performs the map download according to the third condition such that heat generated during the map download according to the third condition may be smaller than heat generated during the map download according to the first condition. When a remeasured temperature of the memory device may be within the low temperature range after the map download according to the second condition, the controller further performs a map upload on at least a part of the controller map data to the external device. When a command, a first logical address and a first physical address mapped to the first logical address within the host map data are received from the external device, the controller updates the controller map data by performing the map download according to the second condition, acquires a physical address, which may be mapped to the first logical address in the updated controller map data as a second physical address, and performs a command operation corresponding to the command on the second physical address. When the measured temperature may be lower than the lowest temperature of the normal operation temperature range of the memory system, the controller disables a part corresponding to the controller map data within the host map data and the controller map data. When a command and a first logical address are received from the external device after the host map data and the controller map data are disabled, the controller updates the controller map data by performing the map download, acquires a physical address corresponding to the first logical address in the updated controller map data as a second physical address, and performs a command operation corresponding to the command on the second physical address. When the measured temperature may be higher than the lowest temperature of the normal operation temperature range of the memory system, the controller enables the host map data and the controller map data. When a command, a first logical address and a first physical address corresponding to the first logical address are received from the external device after the host map data and the controller map data are enabled, and the first physical address may be invalid, the controller updates the controller map data by performing the map download, searches the updated controller map data for a physical address corresponding to the first logical address, acquires the physical address as a second physical address from the updated controller map data, and performs a command operation corresponding to the command on the acquired second physical address.

According to an embodiment of the present invention, an operating method of a controller, the operating method comprising: downloading, from a memory device, one or more memory segments as controller segments, each of the memory segments including at least information representing a mapping relationship between a logical address and a physical address; uploading one or more of the controller segments to a host to store therein as host segments; accessing, within the memory device, a region related to the physical address, which may be included in the information provided from the host; updating one or more of the host and controller segments depending on change of the physical address; and adjusting a time during which at least one of the downloading, uploading and updating may be performed depending on temperature of the memory device to change the temperature of the memory device.

Other technical objects and effects will be understood by those skilled in the art to which this disclosure pertains from the following description.

BRIEF DESCRIPTION OF THE DRAWINGS

FIGS. 2A and 2B are a flowchart and table, respectively, for describing a method in which a memory system in accordance with an embodiment controls temperature thereof through a map download.

FIGS. 4A to 4D are diagrams illustrating examples of map data.

FIGS. 11A and 11B are a flowchart and table, respectively, for describing a method in which the memory system in accordance with an embodiment controls temperature thereof through a map upload.

DETAILED DESCRIPTION

Hereafter, various embodiments of the present disclosure are described in detail with reference to the accompanying drawings. It should be understood that the following description focus on features and aspects of the present invention; other material including well-known technical details may be omitted so as not to unnecessarily obscure the present invention. Throughout the specification, reference to "an embodiment," "another embodiment" or the like is not necessarily to only one embodiment, and different references to any such phrase are not necessarily to the same embodiment(s).

Figure 1:
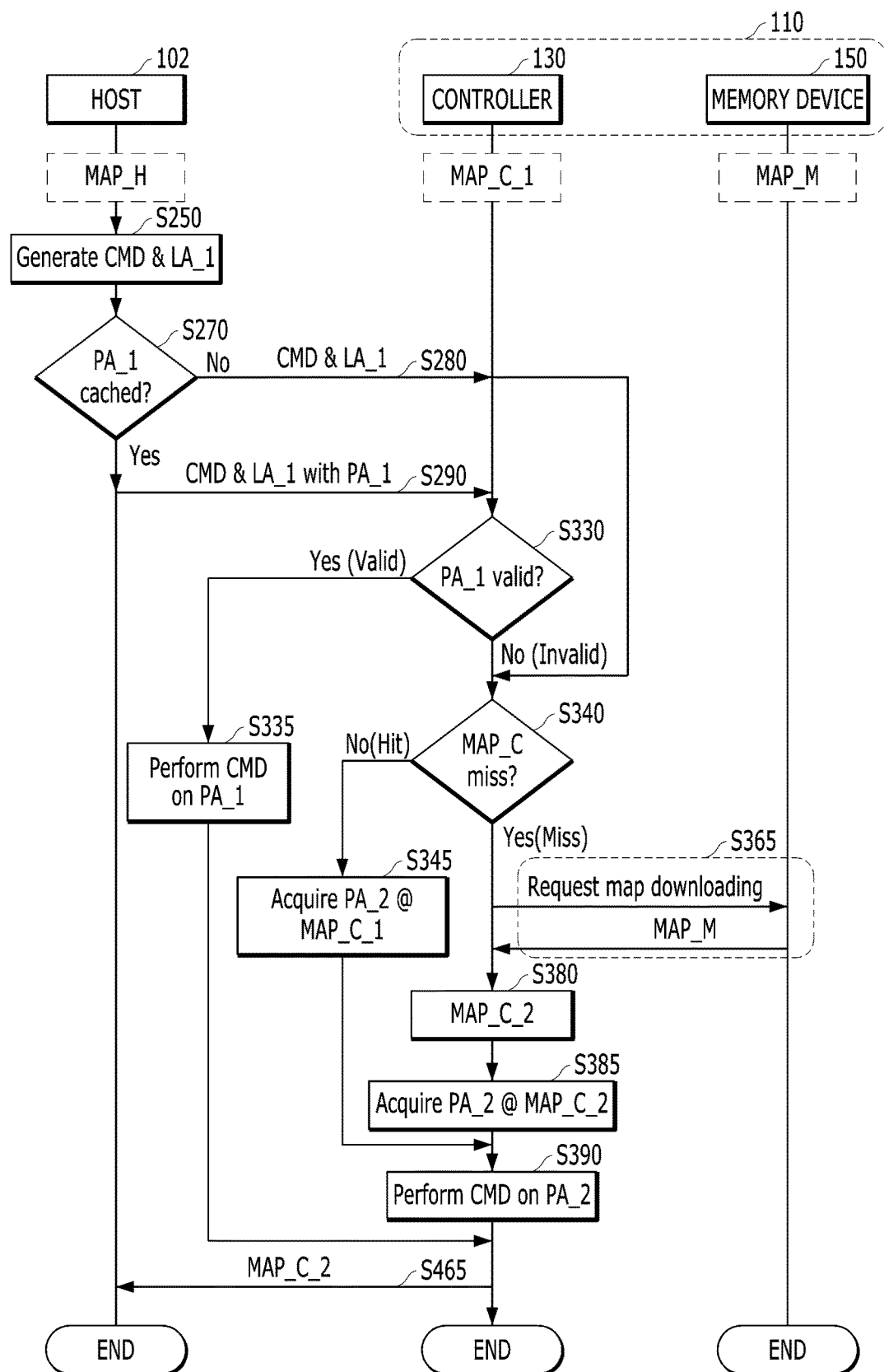
FIG. 1 is a flowchart illustrating a method in which a data processing system in accordance with an embodiment performs a command operation.
Figure 2A:
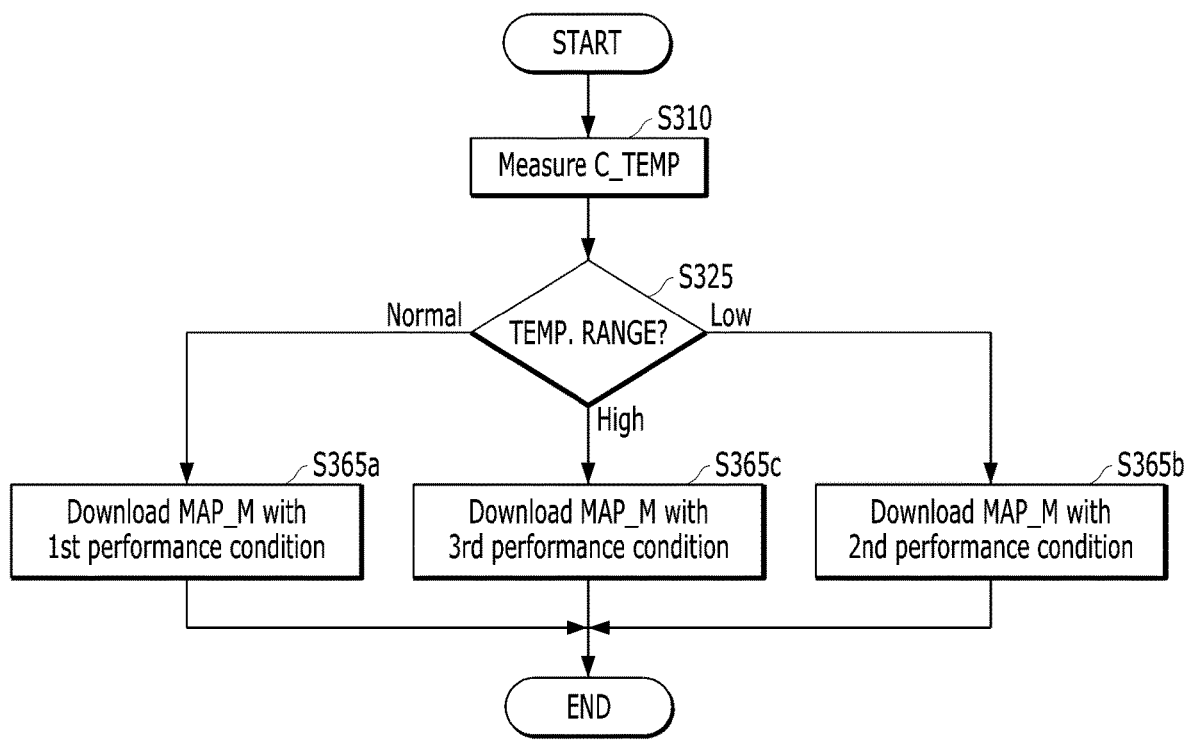

FIG. 1 illustrates a method in which a data processing system performs a map download in response to logical and physical addresses transferred to a memory system 110 from a host 102 and map caching of the memory system 110, and FIG. 2A illustrates a method in which the data processing system performs a map download in preferential response to the internal temperature of the memory system 110 instead of logical and physical addresses transferred to the memory system 110 and map caching of the memory system 110.

FIG. 1 illustrates a method in which a data processing system in accordance with another embodiment performs a command operation. Specifically, FIG. 1 illustrates a data processing system in which the host 102 can transmit a logical address and a physical address associated with the logical address to the memory system 110, in order to improve the input/output performance of the memory system 110.

Referring to FIG. 1, the data processing system in accordance with the present embodiment includes the host 102 and the memory system 110. The host 102 may include a processor, a host controller interface and a host memory, and the memory system 110 may include a controller 130 and a memory device 150. When power is supplied to the host 102 and the memory system 110 (power-on), the host 102 and the memory system 110 may be operably coupled with each other. The memory system 110 may download memory map data MAP_M stored in the memory device 150. The memory system 110 may store the memory map data MAP_M downloaded from the memory device 150 as controller map data MAP_C_1 into a cache memory of the controller 130. The memory system 110 may upload the controller map data MAP_C_1 stored in the cache memory of the controller 130 to the host 102. The host 102 may store the controller map data MAP_C received from the memory system 110 as host map data MAP_H into a host memory. In this way, the host map data MAP_H are stored in the host memory, the memory map data MAP_M are stored in the memory device 150, and the controller map data MAP_C_1 are stored in the memory of the memory system 110.

The processor within the host 102 generates a command CMD and a first logical address LA_1 corresponding to the target of the command CMD in step S250. The host controller interface receives the generated command CMD and the generated first logical address LA_1 from the processor, and transfers the received command and address to the host memory. The host controller interface may determine whether a first physical address PA_1 corresponding to the first logical address LA_1 is stored (PA_1 cached), based on logical-to-physical (L2P) map data included in the host map data MAP_H stored in the host memory, in step S270.

When the determination result of step S270 indicates that the first physical address PA_1 corresponding to the first logical address LA_1 is not included in the host map data MAP_H (No in step S270), the host controller interface transfers the command CMD and the first logical address LA_1 to the memory system 110 without the first physical address PA_1, in step S280. The host controller interface may include the first logical address LA_1 in the command format of the command CMD, and transmit the first logical address LA_A and the command CMD to the memory system 110.

When the determination result of step S270 indicates that the first physical address PA_1 corresponding to the first logical address LA_1 is included in the host map data MAP_H (Yes in step S270), the host controller interface transfers the first physical address PA_1 with the command CMD and the first logical address LA_1 to the memory system 110 in step S290. The host controller interface may include the first physical address PA_1 in a reserved area of the command format of the command CMD, and transmit the first physical address PA_1 and the command CMD to the memory system 110.

When only the command CMD and the first logical address LA_1 without the first physical address PA_1 are received from the host 102 in step S280, the memory system 110 determines whether a map miss occurs between the first logical address LA_1 and the controller map data MAP_C_1, in step S340. That is, the memory system 110 determines whether L2P map data for the first logical address LA_1 are included in the controller map data MAP_C_1, in step S340.

When the first physical address PA_1 is received with the command CMD and the first logical address LA_1 from the host 102 in step S290, the memory system 110 determines the validity of the first physical address PA_1 received with the command CMD in step S330. The memory system 110 may determine whether the first physical address PA_1 is valid, using dirty information D_INF or invalid address information INV_INF.

When the determination result of step S330 indicates that the first physical address PA_1 is valid (Yes in step S330), the memory system 110 may perform a command operation on the first physical address PA_1 in step S335.

When the determination result of step S330 indicates that the first physical address PA_1 is not valid (No in step S330), the memory system 110 determines that the first physical address PA_1 is invalid. Furthermore, the memory system 110 searches for a valid physical address in order to perform the command operation for the first logical address LA_1 on the valid physical address. For this operation, the memory system 110 determines whether a map miss occurs between the first logical address LA_1 and the controller map data MAP_C_1, in step S340. That is, the memory system 110 determines whether the map data for the first logical address LA_1 are included in the controller map data MAP_C_1 stored in the memory of the controller 130, in step S340.

When the determination result of step S340 indicates that the map data for the first logical address LA_1 are included in the controller map data MAP_C_1 (No in step S340), the memory system 110 determines that a map hit, not a map miss, occurred between the first logical address LA_1 and the controller map data MAP_C_1. Thus, the memory system 110 acquires a second physical address PA_2 by searching the controller map data MAP_C_1, the second physical address PA_2 being a valid physical address corresponding to the first logical address LA_1, in step S345. The memory system 110 performs the command operation on the second physical address PA_2 acquired in step S345, in step S390.

When the determination result of step S340 indicates that the map data for the first logical address LA_1 are not included in the controller map data MAP_C_1 (Yes in step S340), the memory system 110 determines that a map miss occurred between the first logical address LA_1 and the controller map data MAP_C_1. That is, the memory system 110 determines that the second physical address PA_2 corresponding to the first logical address LA_1 are not included in the controller map data MAP_C_1.

Therefore, the memory system 110 performs a map download operation for the memory map data MAP_M in step S365. The memory system 110 may request the memory map data MAP_M including the map data of the first logical address LA_1 from the memory device 150. The memory device 150 may transmit the memory map data MAP_M, which includes the valid physical address corresponding to the first logical address LA_1, to the memory system 110 according to a map download request received from the memory system 110. The memory system 110 may store the memory map data MAP_M received from the memory device 150 in the memory. Thus, the controller map data MAP_C_1 may be updated into controller map data MAP_C_2 in step S380.

The memory system 110 acquires the second physical address PA_2 corresponding to the first logical address LA_1 by searching the controller map data MAP_C_2, updated in step S380, in step S385. The memory system 110 may perform a command operation on the second physical address PA_2 acquired in step S385, in step S390.

Then, the memory system 110 may transmit a response to the host 102, the response including a message indicating that the operation for the command CMD received from the host 102 has been completed.

In the present embodiment, when the memory system 110 receives the first logical address LA_1 and the first physical address PA_1 corresponding to the first logical address LA_1 together from the host 102 in step S290 and the first physical address PA_1 is valid (Yes in step S330), steps S345 and S385 of searching for the second physical address PA_2 may be omitted. In particular, when the first physical address PA_1 is valid (Yes in step S330) and the map data for the first logical address LA_1 are included in the controller map data MAP_C_1 (map hit, No in step S340), the map download of step S365 may be omitted. This configuration can further shorten the performance time of the command operation performed by the memory system 110.

The performance period of the map download and the map upload which are performed in a low temperature range may be set to a shorter period than the performance period of the map download and the map upload which are performed in a normal temperature range corresponding to a temperature range in which the memory system can normally operate. Thus, the performance frequency or count of the map downloads and the map uploads in the low temperature range may be higher than that in the normal temperature range. Furthermore, the number of targets of the map download and the map upload which are performed in the low temperature range may be set to a higher value than the number of targets of the map download and the map upload which are performed in the normal temperature range. Therefore, the map download and the map upload in the low temperature range may be performed for a longer time than that in the normal temperature range. In conclusion, due to the performance frequency or count and the performance time of the map downloads and the map uploads which are performed in the low temperature range, the amount of heat generated by the memory system 110 in the low temperature range may be greater than that in the normal temperature range. Thus, the temperature of the memory system 110 in the low temperature range may gradually rise.

The performance period of the map download and the map upload which are performed in a high temperature range may be set to a longer period than the performance period of the map download and the map upload which are performed in the normal temperature range. Thus, the performance frequency or count of the map downloads and the map uploads in the high temperature range may be lower than that in the normal temperature range. Furthermore, the number of targets of the map download and the map upload which are performed in the high temperature range may be set to a lower value than the number of targets of the map download and the map upload which are performed in the normal temperature range. Therefore, the map downloads and the map uploads in the high temperature range may be performed for a shorter time than that in the normal temperature range. In conclusion, due to the performance frequency or count and the performance time of the map downloads and the map uploads which are performed in the high temperature range, the amount of heat generated by the memory system 110 in the high temperature range may be smaller than that in the normal temperature range. Thus, the temperature of the memory system 110 in the high temperature range may gradually drop.

The data processing system in accordance with the present embodiment includes the memory device 150 including a plurality of memory blocks and the memory system 110 for controlling the memory device 150. Each of the memory blocks includes a plurality of memory cells. However, when the temperature is excessively low or high, the resistance of the memory cells may be increased which increases the probability that data corruption will occur. Therefore, when the temperature of the memory device 150 may rise, e.g., in the summer, or drop, e.g., in the winter an error may occur in an operation of the memory device 150.

In order to solve such a problem, the memory device 150 in accordance with the present embodiment may include a temperature sensor for measuring the current temperature of the memory device 150, and store map data of the plurality of memory cells. In order to accurately measure the temperature of the memory device 150, the temperature sensor may be located in the memory device 150. However, the present embodiment is not limited thereto. In an embodiment, the memory device 150 may receive temperature information from an external device operably coupled with the memory device 150.

When the temperature of the memory device 150 is within a set low or high temperature range, the memory system 110 may set the performance conditions of the map download and the map upload accordingly, and thus induce a temperature rise or drop of the memory cell array, such that the temperature of the memory device 150 returns to the normal temperature range. Furthermore, when the temperature of the memory device 150 is within the low temperature range, the memory system 110 may raise the temperature of the memory device 150 by additionally performing the map download and the map upload or advancing the performance time of the map download and the map upload, such that the temperature of the memory device 150 returns to the normal temperature range. Therefore, the memory system 110 in accordance with the present embodiment may effectively improve the performance and data reliability of the memory device 150. For this configuration, the memory system 110 includes a memory for storing map data MAP_C and state information STATE_INF.

The state information STATE_INF may indicate the states of map data of nonvolatile memory elements included in the memory device 150. The state information STATE_INF may be generated and managed for each map segment MS. The state information STATE_INF may be configured in the form of a bitmap. Since the state information STATE_INF is managed in the form of a simple bitmap (for example, 1 or 0), the state information STATE_INF may occupy a small storage space in the memory, and the burden of the memory system 110 to access the state information STATE_INF may be reduced. In the present embodiment, the state information STATE_INF may be configured in the form of a counter. Furthermore, the state information STATE_INF may be configured in the form of a flag corresponding one-to-one to map data. Furthermore, the state information STATE_INF may be configured in the form of a table or list. In the present embodiment, the state information STATE_INF may include dirty information D_INF, map miss information M_INF, invalid address information INV_INF and access information A_INF.

The memory system 110 in accordance with the present embodiment may determine the validity of a physical address PA received with a command from the host 102, using the dirty information D_INF or the invalid address information INV_INF.

The memory system 110 in accordance with the present embodiment may decide the performance period and performance target of the map download, using the dirty information D_INF and/or the map miss information M_INF.

The memory system 110 in accordance with the present embodiment may decide the performance period and performance target of the map upload, using the access information A_INF and/or the map miss information M_INF.

FIGS. 2A and 2B are a flowchart and table, respectively, for describing a method in which the memory system in accordance with the present embodiment controls temperature thereof through the map download.

Referring to FIG. 2A, the map download in accordance with the present embodiment may be performed in step S365 of FIG. 1, and includes an operation in which the memory system 110 transmits a read request for memory map data stored in the memory device 150, and stores the memory map data received from the memory device 150 in the memory. Hereafter, embodiments are described in more detail with reference to the accompanying drawings.

Referring to FIG. 2A, the temperature sensor measures the current temperature C_TEMP of the memory device 150 in step S310. The memory system 110 determines a temperature range to which the measured current temperature C_TEMP belongs, in step S325. When the current temperature C_TEMP is within a preset normal temperature range, the memory system 110 performs a map download for memory map data L2P_MAP_M according to a first performance condition in step S365a. When the current temperature C_TEMP is within a preset low temperature range, the memory system 110 performs the map download for the memory map data L2P_MAP_M according to a second performance condition in step S365b. When the current temperature C_TEMP is within a preset high temperature range, the memory system 110 performs the map download for the memory map data L2P_MAP_M according to a third performance condition in step S365c. The first to third performance conditions may include a performance period and a performance target. The normal temperature range may be set to be higher than the lowest temperature and lower than the highest temperature in the normal temperature range corresponding to a normal operation temperature range of the memory system 110. The low temperature range may be set to be lower than the lowest temperature of the normal temperature range. The high temperature range may be set to be higher than the highest temperature of the normal temperature range of the memory system 110.

The map downloads performed in steps S365a, S365b and S365c in FIG. 2A may be performed under the lead of the memory system 110, without an interactive operation between the memory system 110 and the host 102. The memory system 110 may set the first to third performance conditions, which are differently set according to the current temperature C_TEMP, to a fixed performance period and a fixed performance target.

For example, when the current temperature C_TEMP is within the normal temperature range, the memory system 110 may perform the map download according to the first performance condition. The first performance condition may include a fixed performance period (for example, 12 hours) and a fixed performance target (50% of memory capacity). Furthermore, when the current temperature C_TEMP is within the low temperature range, the memory system 110 may perform the map download according to the second performance condition. The second performance condition may include a fixed performance period (for example, 30 seconds) and a fixed performance target (100% of map cache memory capacity). Furthermore, when the current temperature C_TEMP is within the high temperature range, the memory system 110 may perform the map download according to the third performance condition. The third performance condition may include a fixed performance period (for example, 24 hours) and a fixed performance target (10% of map cache memory capacity).

The map downloads performed in steps S365a, S365b and S365c in FIG. 2A may be performed under the lead of the memory system 110, based on the state information STATE_INF of map data updated by an interactive operation between the memory system 110 and the host 102. The memory system 110 may set the performance period and performance target of the map download according to the current temperature C_TEMP and the state information STATE_INF.

Hereafter, a method in which the memory system 110 in accordance with the present embodiment controls the temperature of the memory device 150 using the dirty information D_INF included in the state information STATE_INF are described.

When the current temperature C_TEMP is within the normal temperature range, the memory system 110 may perform the map download in the case that the dirty information D_INF indicates that the number of L2P map segments L2P_MS each including a logical address LA whose corresponding physical address PA has been changed is equal to or more than 50% (performance period). Furthermore, the memory system 110 may download L2P memory map data L2P_MAP_M corresponding to 50% of L2P controller map data L2P_MAP_C (performance target of 50%).

When the current temperature C_TEMP is within the low temperature range, the memory system 110 may perform the map download in the case that the dirty information D_INF indicates that the number of L2P map segments L2P_MS each including a logical address LA whose corresponding physical address PA has been changed is equal to or more than 10% (performance period). The memory system 110 may download L2P memory map data L2P_MAP_M corresponding to 100% of the L2P controller map data L2P_MAP_C (performance target of 100%).

When the current temperature C_TEMP is within the high temperature range, the memory system 110 may perform the map download in the case that the dirty information D_INF indicates that the number of L2P map segments L2P_MS each including a logical address LA whose corresponding physical address PA has been changed is 100% (performance period). The memory system 110 may download L2P memory map data L2P_MAP_M corresponding to 10% of the L2P controller map data L2P_MAP_C (performance target of 10%).

FIG. 2B illustrates an example of the dirty information D_INF. In the present embodiment, the dirty information D_INF may include information on whether the storage position of data corresponding to a logical address LA has been changed. While a background operation (for example, garbage collection or wear leveling) is performed even without a request from the host 102, the memory system 110 may update map data in response to a change in position of data within the memory device 150. That is, the memory system 110 may check dirty map data which occur while the map data are updated, and reflect the dirty map data into the dirty information D_INF.

The dirty information D_INF may be configured in the form of a bitmap which has the initial value of a first level (for example, 0), and is updated to a second level (for example, 1) when a physical address PA corresponding to a specific logical address LA is changed. That is, the state value '0' of the dirty information D_INF may indicate that the physical address PA corresponding to the logical address LA is not changed. The state value '1' of the dirty information D_INF may indicate that the physical address PA corresponding to the logical address LA has been changed.

As illustrated in FIG. 2B, the L2P controller map data L2P_MAP_C stored in the memory include 10,240 logical addresses LA5120 to LA15359 and physical addresses PA corresponding to the logical addresses. The logical addresses and the physical addresses are grouped into 10 L2P map segments L2P_MS_5 to L2P_MS_14, and each of the L2P map segments L2P_MS_5 to L2P_MS_14 includes 1,024 logical addresses LA and 1,024 physical addresses PA corresponding to the logical addresses LA. Thus, the memory system 110 generates and manages dirty information D_INF on each of the 10 L2P map segments L2P_MS_5 to L2P_MS_14.

Eight L2P map segments L2P_MS_6 to L2P_MS_10 and L2P_MS_12 to L2P_MS_14, whose dirty information D_INF has a state value of '1', include logical addresses LA whose corresponding physical addresses PA have been changed. The other two L2P map segments L2P_MS_5 and L2P_MS_11, whose dirty information D_INF has a state value of '0', include logical addresses LA whose corresponding physical addresses PA are not changed.

That is, 80% of the L2P map segments L2P_MS included in the L2P controller map data L2P_MAP_C illustrated in FIG. 2B have a value of '1' as the state value of the dirty information D_INF. In this case, when the current temperature C_TEMP is within the normal temperature range (performance period of 50% or more) and the low temperature range (performance period of 10% or more), the memory system 110 performs the map download. In the high temperature range (performance period of 90% or more), however, the memory system 110 does not perform the map download.

Hereafter, a method in which the memory system 110 in accordance with the present embodiment controls the temperature of the memory device 150 using the map miss information M_INF included in the state information STATE_INF are described.

Map miss indicates that L2P map data corresponding to a logical address LA transmitted to the memory system 110 from the host 102 are not stored in the memory. Map hit indicates that L2P map data corresponding to a logical address LA transmitted to the memory system 110 from the host 102 are stored in the memory. In the present embodiment, the map miss information M_INF may include the number of times that a map miss occurs. The map miss information M_INF may be configured in the form of a counter which has the initial value of a first level (for example, 0) and is increased whenever a map miss occurs.

When the current temperature C_TEMP is within the normal temperature range, the memory system 110 may perform the map download in the case that the state value of the map miss information M_INF is equal to or more than 10 times (performance period). The memory system 110 may download L2P memory map data L2P_MAP_M corresponding to 50% of the L2P controller map data L2P_MAP_C (performance target of 50%).

When the current temperature C_TEMP is within the low temperature range, the memory system 110 may perform the map download in the case that the state value of the map miss information M_INF is equal to or more than one time (performance period). The memory system 110 may download L2P memory map data L2P_MAP_M corresponding to 100% of the L2P controller map data L2P_MAP_C (performance target of 100%).

When the current temperature C_TEMP is within the high temperature range, the memory system 110 may perform the map download in the case that the state value of the map miss information M_INF is equal to or more than 130 times (performance period). The memory system 110 may download L2P memory map data L2P_MAP_M corresponding to 10% of the L2P controller map data L2P_MAP_C (performance target of 10%).

When the state value of the map miss information M_INF indicating the map miss count is '35' and the current temperature C_TEMP is within the normal temperature range (performance period of 10 times or more) and the low temperature range (performance period of one time or more), the memory system 110 performs the map download. In the high temperature range (performance period of 30 times or more), however, the memory system 110 does not perform the map download.

That is, the memory system 110 in accordance with the present embodiment may differently set the performance condition of the map download according to the current temperature C_TEMP of the memory device 150, and thus induce a temperature rise or drop of the memory device 150 when the current temperature C_TEMP of the memory device 150 is within the preset low or high temperature range. Therefore, the memory system 110 in accordance with the present embodiment can effectively reduce a malfunction of the memory device 150 and an occurrence of data corruption and improve the reliability of data stored therein.

Figure 3:
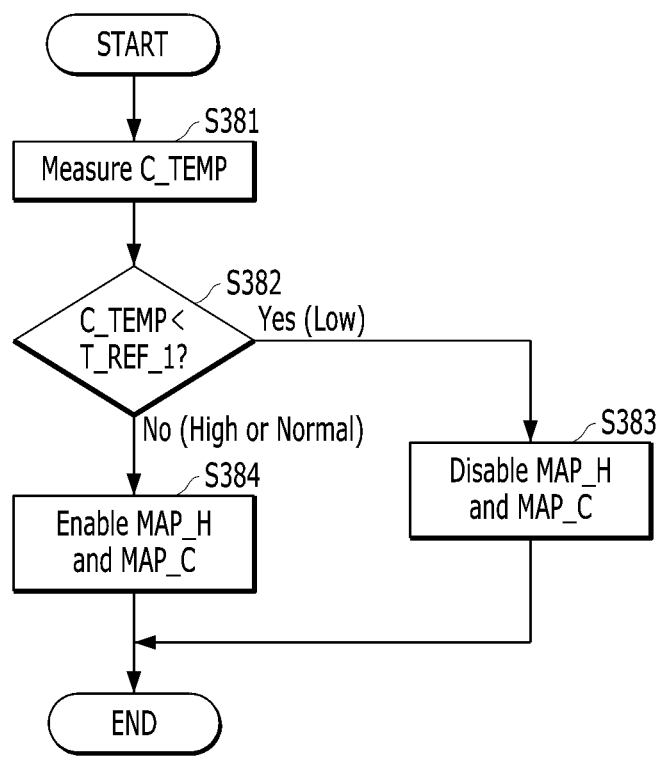
FIG. 3 is a flowchart illustrating a method in which the memory system in accordance with an embodiment controls temperature thereof through a map miss ratio control operation.

FIG. 3 is a flowchart illustrating a method in which the memory system 110 in accordance with the present embodiment adjusts a map miss ratio in order to adjust the performance period and performance target of the map download. FIGS. 4A to 4D illustrate examples of the controller map data MAP_C and the host map data MAP_H which are controlled by the memory system 110.

Hereafter, referring to FIGS. 3 and 4A to 4D, the method in which the memory system 110 in accordance with the present embodiment adjusts the map miss ratio in order to adjust the performance period and performance target of the map download is described. Map miss indicates that L2P map data corresponding to a logical address LA transmitted to the memory system 110 from the host 102 are not stored in the memory.

Referring to FIG. 3, the temperature sensor may remeasure the current temperature C_TEMP under control of the memory system 110 in step S381. Furthermore, the temperature sensor may provide the measured current temperature C_TEMP to the memory system 110.

Thus, the memory system 110 compares the current temperature C_TEMP to a first reference temperature T_REF_1, and determines a temperature range to which the current temperature C_TEMP belongs, in step S382. The first reference temperature T_REF_1 may correspond to the lowest temperature in the normal temperature range indicating the normal operation temperature range of the memory system 110. The first reference temperature T_REF_1 may be preset and stored in the memory system 110. That is, the memory system 110 determines whether the current temperature C_TEMP is lower than the first reference temperature T_REF_1, in step S382.

When the determination result of step S382 indicates that the current temperature C_TEMP is lower than the first reference temperature T_REF_1 (Yes in step S382), the memory system 110 determines that the current temperature C_TEMP is within the low temperature range. Thus, the memory system 110 (e.g., the controller 130) may disable the controller map data MAP_C and the host map data MAP_H, in order to frequently perform the map download by raising the map miss ratio, in step S383. The memory system 110 may disable map segments which coincide with map segments L2P_MS of the controller map data MAP_C, among map segments L2P_MS included in the host map data MAP_H. For this operation, the memory system 110 may transmit a disable signal to the host 102.

Since the map segments coinciding with the map segments L2P_MS of the controller map data MAP_C among the map segments L2P_MS included in the host map data MAP_H are disabled, the host 102 is highly likely to transmit only a first logical address LA_1 without a first physical address PA_1, when transmitting the command CMD to the memory system 110. Thus, when performing a command operation, the memory system 110 needs to search for a second physical address PA_2 corresponding to the first logical address LA_1. Since the map data corresponding to the controller map data MAP_H are all disabled, the memory system 110 determines that a map miss occurred between the first logical address LA_1 and the controller map data MAP_C, and needs to perform the map download.

Referring to FIGS. 4A and 4B, step S383 is described in detail. FIG. 4A illustrates an example of the L2P controller map data L2P_MAP_C including 10 L2P map segments L2P_MS_5 to L2P_MS_14. FIG. 4B illustrates an example of the L2P host map data L2P_MAP_H including (n+1) L2P map segments L2P_MS_0 to L2P_MS_n. The L2P controller map data L2P_MAP_C and the L2P host map data L2P_MAP_H may be reset to an active state when updated.

As illustrated in FIG. 4A, when the current temperature C_TEMP of the memory device 150 is within the low temperature range, the memory system 110 may disable the 10 L2P map segments L2P_MS_5 to L2P_MS_14 included in the controller map data MAP_C (for example, EN=0), in order to frequently perform the map download by raising the map miss ratio.

As illustrated in FIG. 4B, the memory system 110 may disable map segments which coincide with the disabled 10 L2P map segments L2P_MS_5 to L2P_MS_14 of the controller map data MAP_C, among the (n+1) L2P map segments L2P_MS_0 to L2P_MS_n, (for example, EN=0). For this operation, the memory system 110 may transmit the disable signal to the host 102. In the present embodiment, the disable signal may be an enable signal EN having an inactive level (for example, 0).

According to the disable signal (EN=0), the 10 L2P map segments L2P_MS_5 to L2P_MS_14 among the (n+1) L2P map segments L2P_MS_0 to L2P_MS_n included in the host map data MAP_H may be disabled. Thus, the map miss ratio may be increased.

When a logical address corresponding to the target of a command generated by the processor included in the host 102 is 'LA7000', the host 102 recognizes that an L2P map segment corresponding to the logical address 'LA7000' is not included in the host map data MAP_H, because the L2P map segment L2P_MS_6 including the logical address 'LA7000' is disabled. Thus, the host 102 transmits only the command and the logical address LA7000 to the memory system 110 without a physical address PA.

The memory system 110 receives only the logical address LA7000 with the command from the host 102. The memory system 110 searches for a physical address PA corresponding to the logical address LA7000 in order to perform a command operation corresponding to the command received from the host 102 on the memory device 150. Since the L2P map segment L2P_MS_6 corresponding to the logical address LA7000 received from the host 102 was disabled in the controller map data MAP_C, the memory system 110 recognizes that the L2P map segment L2P_MS_6 corresponding to the logical address LA7000 received from the host 102 is not included in the controller map data MAP_C. Thus, the memory system 110 determines that a map miss occurred, requests the L2P map segment L2P_MS_6 corresponding to the logical address LA7000 from the memory device 150, and performs the map download.

That is, when the current temperature C_TEMP of the memory device 150 is within the low temperature range, the memory system 110 may immediately perform the map download by raising the map miss ratio, thereby inducing a temperature rise of the memory device 150. Therefore, the memory system 110 in accordance with the present embodiment can effectively reduce a malfunction of the memory device 150 and an occurrence of data corruption and improve the reliability of data stored therein.

When the determination result of step S382 indicates that the current temperature C_TEMP is not lower than the first reference temperature T_REF_1 (No in step S382), the memory system 110 determines that the current temperature C_TEMP is not within the low temperature range. Thus, the memory system 110 may enable the controller map data MAP_C and the host map data MAP_H, in order not to frequently perform the map download by lowering the map miss ratio, in step S383. For this operation, the memory system 110 may transmit the enable signal to the host 102.

Since the controller map data MAP_C and the host map data MAP_H are enabled, the host 102 is highly likely to transmit the first physical address PA_1 with the first logical address LA_1 when transmitting the command CMD to the memory system 110. Thus, when the first physical address PA_1 is valid during a command operation, the memory system 110 may perform the command operation on the valid first physical address PA_1, and thus does not need to perform the map download. Furthermore, since the map data corresponding to the controller map data MAP_C are all disabled when the first physical address PA_1 is invalid, the memory system 110 may search the controller map data MAP_C for a valid second physical address PA_2 corresponding to the first logical address LA_1, because a map miss of the controller map data MAP_C does not occur. Therefore, the memory system 110 does not need to perform the map download.

Referring to FIGS. 4C and 4D, step S384 is described in detail. As illustrated in FIG. 4C, when the current temperature C_TEMP of the memory device 150 is not within the low temperature range, the memory system 110 may enable the 10 L2P map segments L2P_MS_5 to L2P_MS_14.

As illustrated in FIG. 4C, the memory system 110 may enable map segments which coincide with the disabled 10 L2P map segments L2P_MS_5 to L2P_MS_14 of the controller map data MAP_C, among the (n+1) L2P map segments L2P_MS_0 to L2P_MS_n. For this operation, the memory system 110 may transmit the enable signal (EN=1) to the host 102.

According to the enable signal (EN=1), the 10 L2P map segments L2P_MS_5 to L2P_MS_14 among the (n+1) L2P map segments L2P_MS_0 to L2P_MS_n included in the host map data MAP_H are enabled. Thus, the map miss ratio may be decreased, and the map hit ratio may be increased.

When a logical address corresponding to the target of a command is 'LA7000', the host 102 recognizes that an L2P map segment corresponding to the logical address 'LA7000' is included in the host map data MAP_H, because the L2P map segment L2P_MS_6 including the logical address 'LA7000' is enabled. Thus, the host 102 transmits a physical address PA corresponding to the logical address LA7000 to the memory system 110 with the command and the logical address LA7000.

The memory system 110 determines whether the physical address PA is valid, in order to perform a command operation according to the command, the logical address LA7000 and the physical address PA which are received from the host 102. When the physical address PA is valid, the memory system 110 performs the command operation on the physical address PA. Since the L2P translation operation of steps S340, S345 and S385 in FIG. 2 is not performed, the memory system 110 may generate less heat. Furthermore, since the map download of step S365 in which much heat is generated is not performed, the amount of heat generated by the memory system 110 may be further reduced.

When the physical address PA is invalid, the memory system 110 searches for the physical address PA corresponding to the logical address LA7000. Since the L2P map segment L2P_MS_6 corresponding to the logical address LA7000 received from the host 102 is already enabled in the controller map data MAP_C, the memory system 110 recognizes that the L2P map segment L2P_MS_6 corresponding to the logical address LA7000 is included in the controller map data MAP_C. Thus, the memory system 110 determines that a map hit, not a map miss, occurred, searches the controller map data MAP_C for the L2P map segment L2P_MS_6 corresponding to the logical address LA7000, and does not perform the map download.

That is, when the current temperature C_TEMP of the memory device 150 is within the low temperature range, the memory system 110, the data processing system and the method for driving the same in accordance with the present embodiment may raise the map miss ratio to increase the temperature of the memory system 110 using heat generated by the map download. Therefore, the memory system 110 in accordance with the present embodiment can effectively prevent, or reduce occurrence of, malfunction of the memory device 150 and data corruption, and thus improve the reliability of data stored therein.

That is, when the current temperature C_TEMP of the memory device 150 is not within the low temperature range, the memory system 110, the data processing system and the method for driving the same in accordance with the present embodiment may lower the map miss ratio to reduce overhead of the memory system 110, which is caused by an unnecessary map download. Thus, it is possible to improve the performance speed and efficiency of the command operation of the memory system 110.

Figure 5:
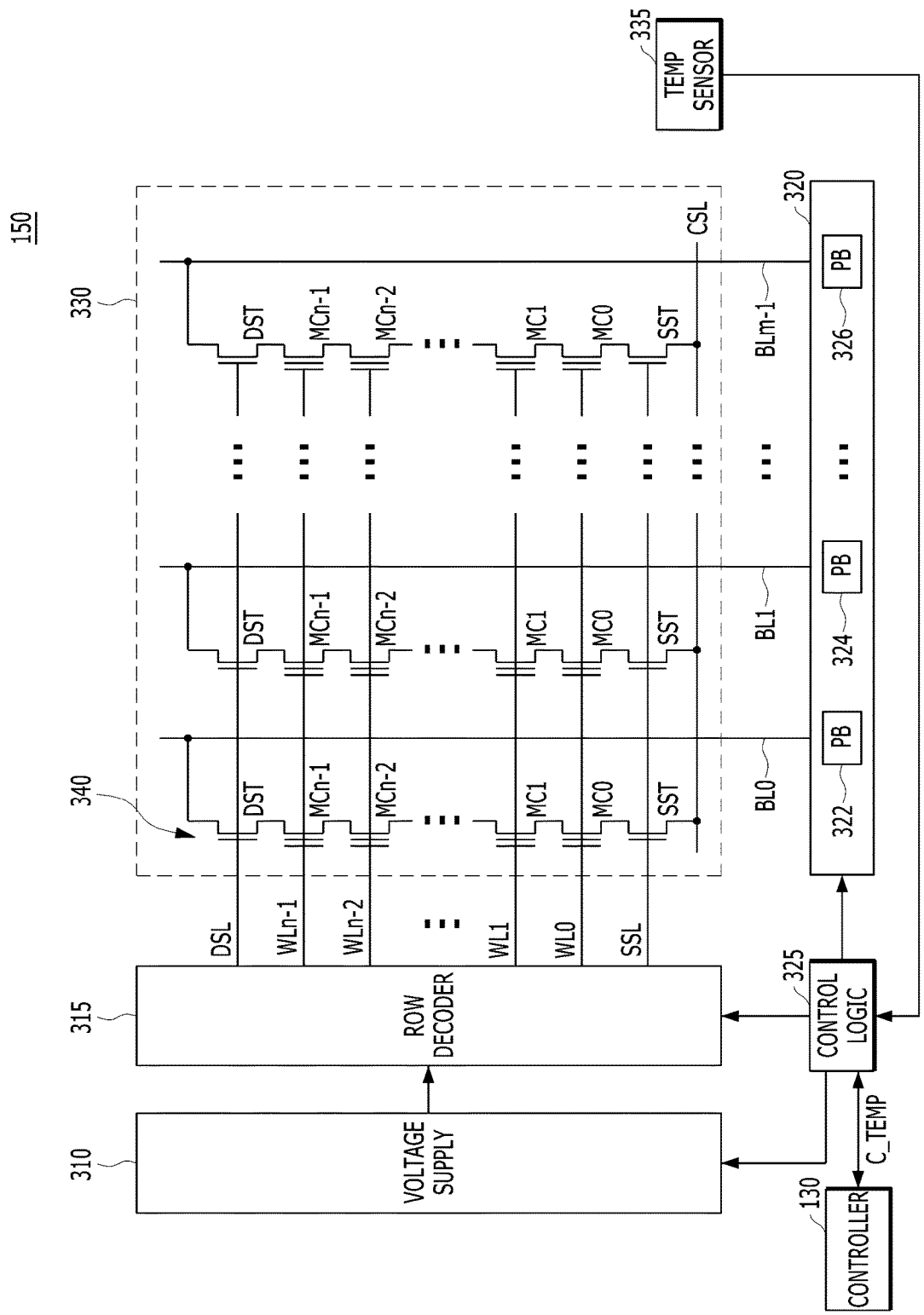
FIG. 5 illustrates a configuration of a memory cell array of a memory block in a memory device, such as that shown in FIG. 6A.

FIG. 5 is a circuit diagram illustrating a configuration of a memory cell array 330 of a memory block in the memory device 150.

Referring to FIG. 3, the memory device 150 may include a plurality of memory blocks BLOCK0 to BLOCKN-1, e.g., BLOCK0 (210), BLOCK1 (220), BLOCK2 (230), and to BLOCKN-1 (240). Each of the memory blocks 210, 220, 230 and 240 may include a plurality of pages, for example 2M pages, the number of which may vary according to circuit design. For example, in some applications, each of the memory blocks may include M pages. Each of the pages may include a plurality of memory cells that are coupled to a word line WL.

Furthermore, each of the plurality of memory blocks in the memory device 150 may be implemented with a single level cell (SLC) memory block with memory cells each capable of storing one bit of data, or a multi-level cell (MLC) memory block with memory cells each capable of storing two or more bits of data. Some examples of MLC memory blocks are a double level cell memory block (also called an MLC memory block), a triple level cell (TLC) memory block, and a quadruple level cell (QLC) memory block.

According to an embodiment of the present invention, the memory device 150 may be a non-volatile memory, such as a flash memory, e.g., a NAND flash memory. However, the memory device 150 may be realized as any one of a Phase Change Random-access Memory (PCRAM), a Resistive Random-access Memory (RRAM or ReRAM), a Ferroelectric Random-access Memory (FRAM), a Spin Transfer Torque Magnetic Random-access Memory (SU-RAM or STT-MRAM) and the like.

The memory blocks 210, 220, 230, . . . 240 may store the data transferred from a host through a program operation, and transfer data stored therein to the host through a read operation.

FIG. 5 is a circuit diagram illustrating a memory block 330 in the memory device 150.

Referring to FIG. 5, the memory device 150 may include a memory block 330 comprising a plurality of memory cell arrays, a row decoder 315, a read/write circuit 320, a voltage supplier 310, and a control logic 325. The memory device 150 may include a temperature sensor 335 that detects a current temperature of the memory device 150. The temperature sensor 335 may be located inside the memory device 150 to accurately measure the temperature of the memory device, but as previously noted the present invention is not limited thereto. In one embodiment of the invention, the temperature sensor 335 may measure the current temperature under the control of control logic 325. The temperature sensor 335 may also provide the measured current temperature to the control logic 325. The control logic 325 may also provide the measured current temperature to a controller 130 (shown in FIG. 6A). Thus, the controller 130 compares the current temperature with a reference temperature, and determines the temperature range to which the current temperature belongs. The reference temperature may be preset and stored in the controller 130.

Referring to FIG. 5, the memory block 330 may correspond to any of the plurality of memory blocks 152 to 156.

The memory block 330 of the memory device 150 may include a plurality of cell strings 340 which are electrically coupled to bit lines BL0 to BLm-1, respectively. The cell string 340 of each column may include at least one drain select transistor DST and at least one source select transistor SST. A plurality of memory cells or a plurality of memory cell transistors MC0 to MCn-1 may be electrically coupled in series between the select transistors DST and SST. The respective memory cells MC0 to MCn-1 may be configured as single level cells (SLC) each of which may store 1 bit of information, or by multi-level cells (MLC) each of which may store data information of a plurality of bits. The strings 340 may be electrically coupled to the corresponding bit lines BL0 to BLm-1, respectively. For reference, in FIG. 5, 'DSL' denotes a drain select line, 'SSL' denotes a source select line, and 'CSL' denotes a common source line.

While FIG. 5 only shows, as an example, that the memory block 330 is constituted with NAND flash memory cells, it is to be noted that the memory block 330 of the memory device 150 is not limited to a NAND flash memory. The memory block 330 may be realized by a NOR flash memory, a hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supplier 310 of the memory device 150 may provide word line voltages, for example, a program voltage, a pass voltage, a selection read voltage and non-selection read voltage, among other possible voltages to be supplied to respective word lines according to an operation mode and voltages to be supplied to bulks, for example, well regions in which the memory cells are formed. The voltage supplier 310 may perform a voltage generating operation under the control of control logic 325. The voltage supplier 310 may generate a plurality of variable read voltages to generate a plurality of read data, select one of the memory blocks or sectors of a memory cell array under the control of the control logic 325, select one of the word lines of the selected memory block, and provide the word line voltages to the selected word line and unselected word lines.

The row decoder 315 of the memory device 150 may select one of a plurality of the memory blocks 330 in response to an address ADDR. The row decoder 315 may select one of word lines of the selected memory block. The row decoder 315 may transfer a word line voltage, from the voltage supplier 310 to the selected word line. During a program operation, the row decoder 315 may transfer a program/verification voltage to the selected word line and a pass voltage Vpass to each of unselected word lines.

The read/write circuit 320 of the memory device 150 may be controlled by the control logic 325, and may serve as a sense amplifier or a write driver according to an operation mode. During a verification operation or a normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 6A:
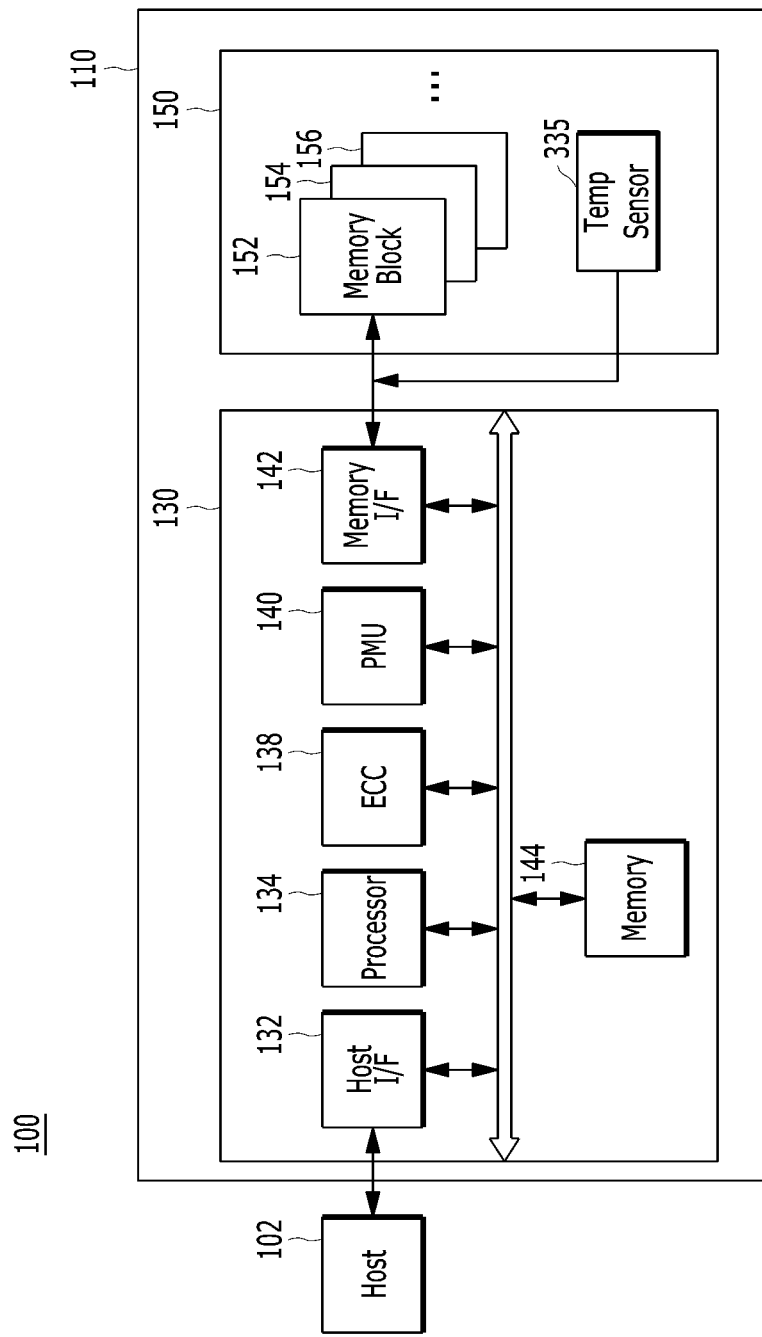
FIG. 6A illustrates a configuration of a data processing system including a memory system according to an embodiment of the present invention.

The control logic 325 may control the row decoder 315, the read/write circuit 320, and the voltage supplier 310 in response to a command from a controller 130 (see FIG. 6A). The control logic 325 may control the voltage supplier 310 and the read/write circuit 320 in response to a write command such that data (DATA) from the outside are programmed in selected memory cells. For example, the selected memory cells may be programmed in an incremental step pulse programming (ISPP) scheme under control of the control logic 325.

In the ISPP scheme, a program cycle for programming the selected memory cells (e.g., memory cells connected to one word line) is performed. One program cycle (or program operation) is composed of a plurality of program loops. In each program loop, at least one program pulse and at least one verification pulse are used. The program pulse has a level of the program voltage Vpgm, and the verification pulse has a level of the verification voltage. In the ISPP scheme, a level of the program voltage Vpgm may increase as a loop count increases.

FIG. 6A is a block diagram illustrating a data processing system 100 according to an embodiment of the present invention.

Referring to FIG. 6A, a data processing system 100 may include a host 102 engaged or operably coupled to a memory system 110.

The host 102 may include, for example, a portable electronic device such as a mobile phone, an MP3 player and a laptop computer, or an electronic device such as a desktop computer, a game player, a television (TV), a projector and the like.

The host 102 also includes at least one operating system (OS), which can generally manage, and control, functions and operations performed in the host 102. The OS can provide interoperability between the host 102 engaged with the memory system 110 and the user needing and using the memory system 110. The OS may support functions and operations corresponding to user's requests. By way of example but not limitation, the OS can be a general operating system or a mobile operating system according to mobility of the host 102. The general operating system may be split into a personal operating system and an enterprise operating system according to system requirements or a user's environment. The personal operating system, including Windows and Chrome, may be subject to support services for general purposes. But the enterprise operating systems can be specialized for securing and supporting high performance, including Windows servers, Linux, Unix and the like. Further, the mobile operating system may include an Android, an iOS, a Windows mobile and the like. The mobile operating system may be subject to support services or functions for mobility (e.g., a power saving function). The host 102 may include a plurality of operating systems. The host 102 may execute multiple operating systems, corresponding to a user's request. The host 102 may transmit a plurality of commands corresponding to the user's requests to the memory system 110, thereby performing operations corresponding to commands within the memory system 110. Handling plural commands in the memory system 110 is described below with reference to FIGS. 4 and 5.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, for example, a dynamic random access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) and a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in any of the various types of memory systems as exemplified above.

By way of example but not limitation, the controller 130 and the memory device 150 may be integrated into a single semiconductor device. The controller 130 and memory device 150 may be so integrated into an SSD to improve an operation speed. When the memory system 110 is used as an SSD, the operating speed of the host 102 connected to the memory system 110 can be improved more than that of the host 102 implemented with a hard disk. In addition, the controller 130 and the memory device 150 may be integrated into one semiconductor device to form a memory card, such as a PC card (PCMCIA), a compact flash card (CF), a memory card such as a smart media card (SM, SMC), a memory stick, a multimedia card (MMC, RS-MMC, MMC-micro), a SD card (SD, miniSD, microSD, SDHC), a universal flash memory or the like.

The memory device 150 may include a temperature sensor 335 that detects a current temperature of the memory device 150. The temperature sensor 335 may be disposed within the memory device 150 to accurately measure the temperature of the memory device, but the present invention is not limited to any specific placement of the temperature sensor 335 so long as it accurately measures the temperature of the memory device 150. In one embodiment of the invention, the temperature sensor 335 may measure the current temperature under the control of the controller 130. The temperature sensor 335 may also provide the measured current temperature to the controller 130. Thus, the controller 130 compares the current temperature with a reference temperature, and determines the temperature range to which the current temperature belongs. The reference temperature may be preset and stored in the controller 130.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device that retains stored data even when electrical power is not supplied. The memory device 150 may store data provided from the host 102 through a write operation, while providing data stored therein to the host 102 through a read operation. The memory device 150 may include a plurality of memory blocks 152, 154, 156, each of which may include a plurality of pages. Each of the plurality of pages may include a plurality of memory cells to which a plurality of word lines (WL) are electrically coupled. The memory device 150 also includes a plurality of memory dies, each of which includes a plurality of planes, each of which includes a plurality of memory blocks. In addition, the memory device 150 may be a non-volatile memory device, for example a flash memory, wherein the flash memory may be a three-dimensional stack structure.

The controller 130 may control overall operations of the memory device 150, such as read, write, program, and erase operations. For example, the controller 130 may control the memory device 150 in response to a request from the host 102. The controller 130 may provide the data, read from the memory device 150, to the host 102. The controller 130 may store the data, provided by the host 102, into the memory device 150.

The controller 130 may include a host interface (I/F) 132, a processor 134, an error correction code (ECC) component 138, a power management unit (PMU) 140, a memory interface (I/F) 142 and a memory 144, all operatively coupled via an internal bus.

The host interface 132 may process commands and data provided from the host 102, and may communicate with the host 102 through at least one of various interface protocols, such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI) and/or integrated drive electronics (IDE). According to an embodiment, the host interface 132 exchanges data with the host 102, which may be implemented through firmware called a host interface layer (HIL).

The ECC component 138 can correct error bits of the data to be processed in (e.g., outputted from) the memory device 150, which may include an ECC encoder and an ECC decoder. Here, the ECC encoder can perform error correction encoding of data to be programmed in the memory device 150 to generate encoded data to which a parity bit is added and store the encoded data in memory device 150. The ECC decoder can detect and correct errors contained in a data read from the memory device 150 when the controller 130 reads the data stored in the memory device 150. In other words, after performing error correction decoding on the data read from the memory device 150, the ECC component 138 can determine whether the error correction decoding has succeeded and output an instruction signal (e.g., a correction success signal or a correction fail signal). The ECC component 138 can use the parity bit which is generated during the ECC encoding process, for correcting the error bit of the read data. When the number of error bits is greater than or equal to a threshold number of correctable error bits, the ECC component 138 may not correct error bits but instead may output an error correction fail signal indicating failure in correcting the error bits.

The ECC component 138 may perform an error correction operation based on a coded modulation, such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), and/or a Block coded modulation (BCM). The ECC component 138 may include any and all circuits, modules, systems or devices for performing the error correction operation based on at least one of the above described codes.

The PMU 140 may manage, control or provide an electrical power provided in the controller 130.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 in a case when the memory device 150 is a flash memory and, in particular, when the memory device 150 is a NAND flash memory. The memory interface 142 can provide an interface for handling commands and data between the controller 130 and the memory device 150, for example, operations of a NAND flash interface, in particular, operations between the controller 130 and the memory device 150. According to an embodiment, the memory interface 142 can be implemented through firmware called a Flash Interface Layer (FIL) as a component for exchanging data with the memory device 150.

The memory 144 may support operations performed by the memory system 110 and the controller 130. The memory 144 may store temporary or transactional data for operations in the memory system 110 and the controller 130. The controller 130 may control the memory device 150 in response to a request from the host 102. The controller 130 may deliver data read from the memory device 150 to the host 102. The controller 130 may store data entered through the host 102 within the memory device 150. The memory 144 may be used to store data for the controller 130 and the memory device 150 to perform operations such as read operations or program/write operations.

The memory 144 may be implemented with a volatile memory. The memory 144 may be implemented with a static random access memory (SRAM), a dynamic random access memory (DRAM) or both. Although FIG. 6A exemplifies the second memory 144 disposed within the controller 130, the present invention is not limited thereto. That is, the memory 144 may be located within or external to the controller 130. For instance, the memory 144 may be embodied by an external volatile memory having a memory interface transferring data and/or signals between the memory 144 and the controller 130.

The memory 144 can store data for performing operations such as data writing and data reading requested by the host 102 and/or data transfer between the memory device 150 and the controller 130 for background operations such as garbage collection and wear levelling as described above. According to an embodiment, for supporting operations in the memory system 110, the memory 144 may include a program memory, a data memory, a write buffer/cache, a read buffer/cache, a data buffer/cache, a map buffer/cache, and the like.

The memory 144 may store map data and state information. The controller map data includes L2P map data comprising L2P segments including a logical address used in the host 102 and a physical address of the memory device 150 corresponding to the logical address. The controller map data may further include P2L map data comprising P2L segments including the physical address used and the logical address corresponding to the physical address.

According to an embodiment, when an erase request E_REQ with the first logical address from the host 102 is received, the controller 130 correlates the first logical address from the host 102 to erase information E_INF including an erased physical address EPA or an erased state value EV. The controller 130 may perform an unmap operation to the first logical address by invalidating a physical address mapped to the first logical address in the map data. Then the controller 130 corresponds the first logical address into an erased physical address EPA or an erased state value EV in the map data.

In addition, the memory 144 may store state information as well as controller map data. The state information may include dirty information, invalid address information, valid storage element information, free block number information, and erased state information. The memory system 110 may determine validity of a physical address and a logical address received with an erase request E_REQ from a host 102 using dirty information or invalid address information. In an embodiment of the present disclosure, when the erase request E_REQ is received with the logical address, the controller 130 updates an erase state information of the logical address to have an erase state value EV. In addition, the memory system 110 may invalidate a physical address corresponding to a logical address of the erase request E_REQ, and then change the valid page count VPC of the memory block corresponding to the invalidated physical address. In addition, the memory system may perform garbage collection on a memory block having a number of valid pages less than a set number. When the free block number information is less than or equal to a set number, the memory system 110 may perform garbage collection.

The processor 134 may be implemented with a microprocessor and/or a central processing unit (CPU). The memory system 110 may include one or more processors 134. The processor 134 may control the overall operations of the memory system 110. By way of example but not limitation, the processor 134 can control a program operation or a read operation of the memory device 150, in response to a write request or a read request entered from the host 102. According to an embodiment, the processor 134 may use or execute firmware to control the overall operations of the memory system 110. Herein, the firmware may be referred to as a flash translation layer (FTL). The FTL may perform an operation such as, an interface between the host 102 and the memory device 150. The host 102 may transmit requests for write and read operations to the memory device 150 through the FTL.

The FTL may manage operations of address mapping, garbage collection, wear-leveling and the like. Particularly, the FTL may load, generate, update, or store map data. Therefore, the controller 130 may map a logical address, which is entered from the host 102, with a physical address of the memory device 150 through the map data. The memory device 150 may act like a general storage device to perform a read or write operation because of the address mapping operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the previous particular page to the another newly programed page) due to a characteristic of a flash memory device. Further, the controller 130 may store map data of the new data into the FTL.

For example, when performing an operation requested from the host 102 in the memory device 150, the controller 130 uses the processor 134 implemented in a microprocessor or central processing unit (CPU) or the like. The processor 134 engaged with the memory device 150 can handle instructions or commands corresponding to an inputted command from the host 102. The controller 130 can perform a foreground operation as a command operation, corresponding to a command inputted from the host 102, such as a program operation corresponding to a write command, a read operation corresponding to a read command, an erase/discard operation corresponding to an erase/discard command and a parameter set operation corresponding to a set parameter command or a set feature command with a set command.

For another example, the controller 130 may perform a background operation on the memory device 150 through the processor 134. By way of example but not limitation, the background operation for the memory device 150 includes copying data stored in a memory block among the memory blocks 152, 154, 156 in the memory device 150 to another memory block, e.g., a garbage collection (GC) operation. The background operation can include moving or swapping data stored in at least one of the memory blocks 152, 154, 156 into at least another of the memory blocks 152, 154, 156, e.g., a wear leveling (WL) operation. During a background operation, the controller 130 may use the processor 134 for storing the map data stored in the controller 130 to at least one of the memory blocks 152, 154, 156 in the memory device 150, e.g., a map flush operation. A bad block management operation of checking or searching for bad blocks among the memory blocks 152, 154, 156 is another example of a background operation performed by the processor 134.

In the memory system 110, the controller 130 performs a plurality of command operations corresponding to a plurality of commands entered from the host 102. For example, when performing a plurality of program operations corresponding to plural program commands, a plurality of read operations corresponding to plural read commands and a plurality of erase operations corresponding to plural erase commands sequentially, randomly or alternatively, the controller 130 can determine which channel(s) or way(s) among a plurality of channels (or ways) for connecting the controller 130 to a plurality of memory dies included in the memory 150 is/are proper or appropriate for performing each operation. The controller 130 can send or transmit data or instructions via determined channels or ways for performing each operation. The plurality of memory dies included in the memory 150 can transmit an operation result via the same channels or ways, respectively, after each operation is complete. Then, the controller 130 may transmit a response or an acknowledge signal to the host 102. In an embodiment, the controller 130 can check a status of each channel or each way. In response to a command entered from the host 102, the controller 130 may select at least one channel or way based on the status of each channel or each way so that instructions and/or operation results with data may be delivered via selected channel(s) or way(s).

By way of example but not limitation, the controller 130 can recognize statuses regarding a plurality of channels (or ways) associated with a plurality of memory dies included in the memory device 150. The controller 130 may determine the state of each channel or each way as a busy state, a ready state, an active state, an idle state, a normal state and/or an abnormal state. The controller's determination of which channel or way an instruction (and/or a data) is delivered through can be associated with a physical block address, e.g., which die(s) the instruction (and/or the data) is delivered to. The controller 130 can refer to descriptors delivered from the memory device 150. The descriptors can include a block or page of parameters that describe relevant characteristics about the memory device 150, which is data with a specific format or structure. For instance, the descriptors may include device descriptors, configuration descriptors, unit descriptors, and the like. The controller 130 can refer to, or use, the descriptors to determine with which channel(s) or way(s) an instruction or a data is exchanged.

A management unit (not shown) may be included in the processor 134. The management unit may perform bad block management of the memory device 150. The management unit may find bad memory blocks in the memory device 150, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may enhance or improve performance of the memory system 110.

Figure 6B:
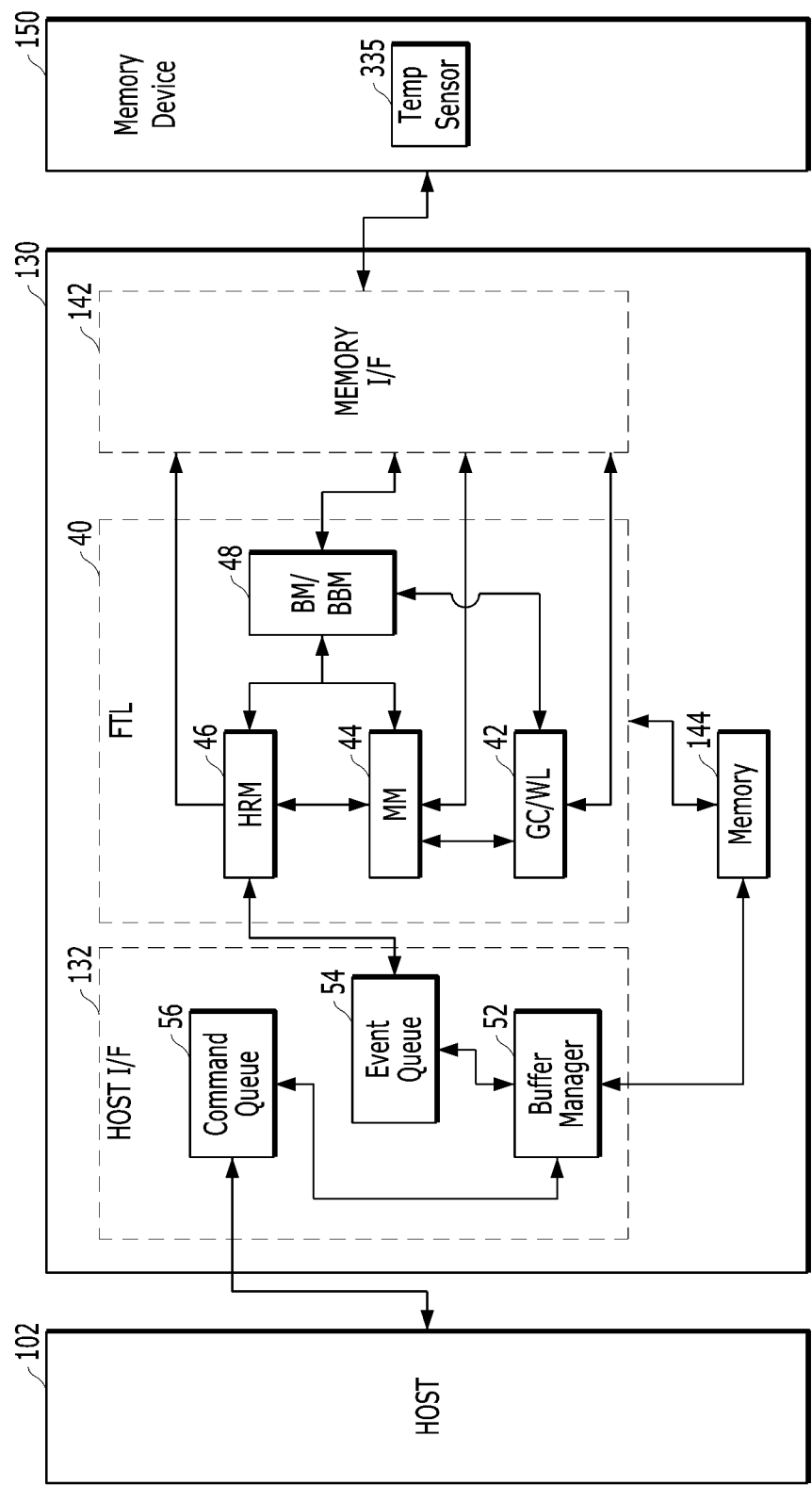
FIG. 6B illustrates a configuration of a memory system according to an embodiment of the present invention.

Referring to FIG. 6B, a controller in a memory system according to another embodiment of this disclosure is described in detail. The memory system shown in FIG. 6B may correspond to at least one of the plurality of memory systems 110 shown in FIG. 6A. The controller 130 cooperates with the host 102 and the memory device 150. As illustrated, the controller 130 includes a host interface 132, a flash translation layer (FTL) 40, as well as the host interface 132, the memory interface 142 and the memory 144 previously identified in connection with FIG. 6A.

Although not shown in FIG. 6B, according to an embodiment, the ECC component 138 described in FIG. 6a may be included in the flash translation layer (FTL) 40. In another embodiment, the ECC component 138 may be implemented as a separate module, a circuit, firmware or the like, which is included in, or associated with, the controller 130.

The host interface 132 is for handling commands, data, and the like transmitted from the host 102. By way of example but not limitation, the host interface 132 may include a command queue 56, a buffer manager 52 and an event queue 54. The command queue 56 may sequentially store commands, data, and the like received from the host 102 and output them to the buffer manager 52 in an order in which they are stored. The buffer manager 52 may classify, manage or adjust the commands, the data, and the like, which are received from the command queue 56. The event queue 54 may sequentially transmit events for processing the commands, the data, and the like received from the buffer manager 52.

A plurality of commands or data of the same characteristic, e.g., all read or all write commands, may be transmitted from the host 102, or commands and data of different characteristics, e.g., read and write commands, may be transmitted to the memory system 110 after being mixed or jumbled by the host 102. For example, a plurality of commands for reading data (read commands) may be delivered, or read commands and commands for programming/writing data (write commands) may be alternately transmitted to the memory system 110. The host interface 132 may store commands, data, and the like, which are transmitted from the host 102, to the command queue 56 sequentially. Thereafter, the host interface 132 may estimate or predict what kind of internal operation the controller 130 will perform according to the characteristics of commands, data, and the like, which have been received from the host 102. The host interface 132 can determine a processing order and a priority of commands, data and the like, based at least on their characteristics. According to characteristics of commands, data, and the like transmitted from the host 102, the buffer manager 52 in the host interface 132 is configured to determine whether the buffer manager should store commands, data, and the like in the memory 144, or whether the buffer manager should deliver the commands, the data, and the like into the flash translation layer (FTL) 40. The event queue 54 receives events, entered from the buffer manager 52, which are to be internally executed and processed by the memory system 110 or the controller 130 in response to the commands, the data, and the like transmitted from the host 102, to deliver the events into the flash translation layer (FTL) 40 in the order received.

According to an embodiment, the host interface 132 described in FIG. 6B may perform some functions of the controller 130 described in FIG. 6A. The host interface 132 may set the first memory 104 in the host 102 as a slave and add the first memory 104 as an additional storage space which is controllable or usable by the controller 130.

According to an embodiment, the flash translation layer (FTL) 40 can include a host request manager (HRM) 46, a map manager (MM) 44, a state manager (GC/WL) 42 and a block manager (BM/BBM) 48. The host request manager (HRM) 46 can manage the events entered from the event queue 54. The map manager (MM) 44 can handle or control map data. The state manager (GC/WL) 42 can perform garbage collection (GC) or wear leveling (WL). The block manager 48 can execute commands or instructions on a block in the memory device 150.

By way of example but not limitation, the host request manager (HRM) 46 can use the map manager (MM) 44 and the block manager 48 to handle or process requests according to the read and program commands, and events which are delivered from the host interface 132. The host request manager (HRM) 46 can send an inquiry request to the map data manager (MM) 44, to determine a physical address corresponding to the logical address which is entered with the events. The host request manager (HRM) 46 can send a read request with the physical address to the memory interface 142, to process the read request (handle the events). On the other hand, the host request manager (HRM) 46 can send a program request (write request) to the block manager 48, to program data to a specific empty page (currently having no data) in the memory device 150, and then, can transmit a map update request corresponding to the program request to the map manager (MM) 44, to update an item relevant to the programmed data in information of mapping the logical-physical addresses to each other.

Here, the block manager 48 can convert a program request delivered from the host request manager (HRM) 46, the map data manager (MM) 44, and/or the state manager 42 into a flash program request used for the memory device 150, to manage flash blocks in the memory device 150. In order to maximize or enhance program or write performance of the memory system 110 (see FIG. 6a), the block manager 48 may collect program requests and send flash program requests for multiple-plane and one-shot program operations to the memory interface 142. In an embodiment, the block manager 48 sends several flash program requests to the memory interface 142 to enhance or maximize parallel processing of the multi-channel and multi-directional flash controller.

On the other hand, the block manager 48 can be configured to manage blocks in the memory device 150 according to the number of valid pages, select and erase blocks having no valid pages when a free block is needed, and select a block including the least number of valid pages when it is determined that garbage collection is necessary. The state manager 42 can perform garbage collection to move the valid data to an empty block and erase the blocks containing the moved valid data so that the block manager 48 may have enough free blocks (empty blocks with no data). If the block manager 48 provides information regarding a block to be erased to the state manager 42, the state manager 42 may check all flash pages of the block to be erased to determine whether each page is valid. For example, to determine validity of each page, the state manager 42 can identify a logical address recorded in an out-of-band (OOB) area of each page. To determine whether each page is valid, the state manager 42 can compare the physical address of the page with the physical address mapped to the logical address obtained from the inquiry request. The state manager 42 sends a program request to the block manager 48 for each valid page. A mapping table can be updated through the update of the map manager 44 when the program operation is complete.

The map manager 44 can manage a logical-physical mapping table. The map manager 44 can process requests such as queries, updates, and the like, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request can be sent to the block manager 48 so that a clean cache block is made and the dirty map table may be stored in the memory device 150.

On the other hand, when garbage collection is performed, the state manager 42 copies valid page(s) into a free block, and the host request manager (HRM) 46 can program the latest version of the data for the same logical address of the page and currently issue an update request. When the state manager 42 requests the map update in a state in which copying of valid page(s) is not completed normally, the map manager 44 may not perform the mapping table update. It is because the map request is issued with old physical information when the state manger 42 requests a map update and a valid page copy is completed later. The map manager 44 may perform a map update operation to ensure accuracy only when the latest map table still points to the old physical address.

According to an embodiment, at least one of the state manager 42, the map manager 44 or the block manager 48 can include circuitry for performing its own operation. As used in this disclosure, the term 'circuitry' refers to any and all of the following:(a) hardware-only circuit implementations (such as implementations in only analog and/or digital circuitry) and (b) to combinations of circuits and software (and/or firmware), such as (as applicable):(i) to a combination of processor(s) or (ii) to portions of processor(s)/ software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even when the software or firmware is not physically present. This definition of 'circuitry' applies to all uses of this term in this application, including in any claims. As a further example, as used in this application, the term "circuitry" also covers an implementation of merely a processor (or multiple processors) or portion of a processor and its (or their) accompanying software and/or firmware. The term "circuitry" also covers, for example, and when applicable to a particular claim element, an integrated circuit for a storage device.

The memory device 150 can include a plurality of memory blocks. A memory block can be any of different types of memory blocks such as a single level cell (SLC) memory block, a multi level cell (MLC) Cell) memory block or the like, according to the number of bits that can be stored or represented in one memory cell. Here, the SLC memory block includes a plurality of pages implemented by memory cells, each storing one bit of data. The SLC memory block can have high data I/O operation performance and high durability. The MLC memory block includes a plurality of pages implemented by memory cells, each storing multi-bit data (e.g., two bits or more). The MLC memory block can have greater storage capacity for the same space compared to the SLC memory block. The MLC memory block can be highly integrated in a view of storage capacity. In an embodiment, the memory device 150 may be implemented with MLC memory blocks such as an MLC memory block, a triple level cell (TLC) memory block, a quadruple level cell (QLC) memory block and a combination thereof. The MLC memory block may include a plurality of pages implemented by memory cells, each capable of storing 2-bit data. The triple level cell (TLC) memory block can include a plurality of pages implemented by memory cells, each capable of storing 3-bit data. The quadruple level cell (QLC) memory block can include a plurality of pages implemented by memory cells, each capable of storing 4-bit data. In another embodiment, the memory device 150 can be implemented with a block including a plurality of pages implemented by memory cells, each capable of storing 5-bit or more bit data.

Figure 7:
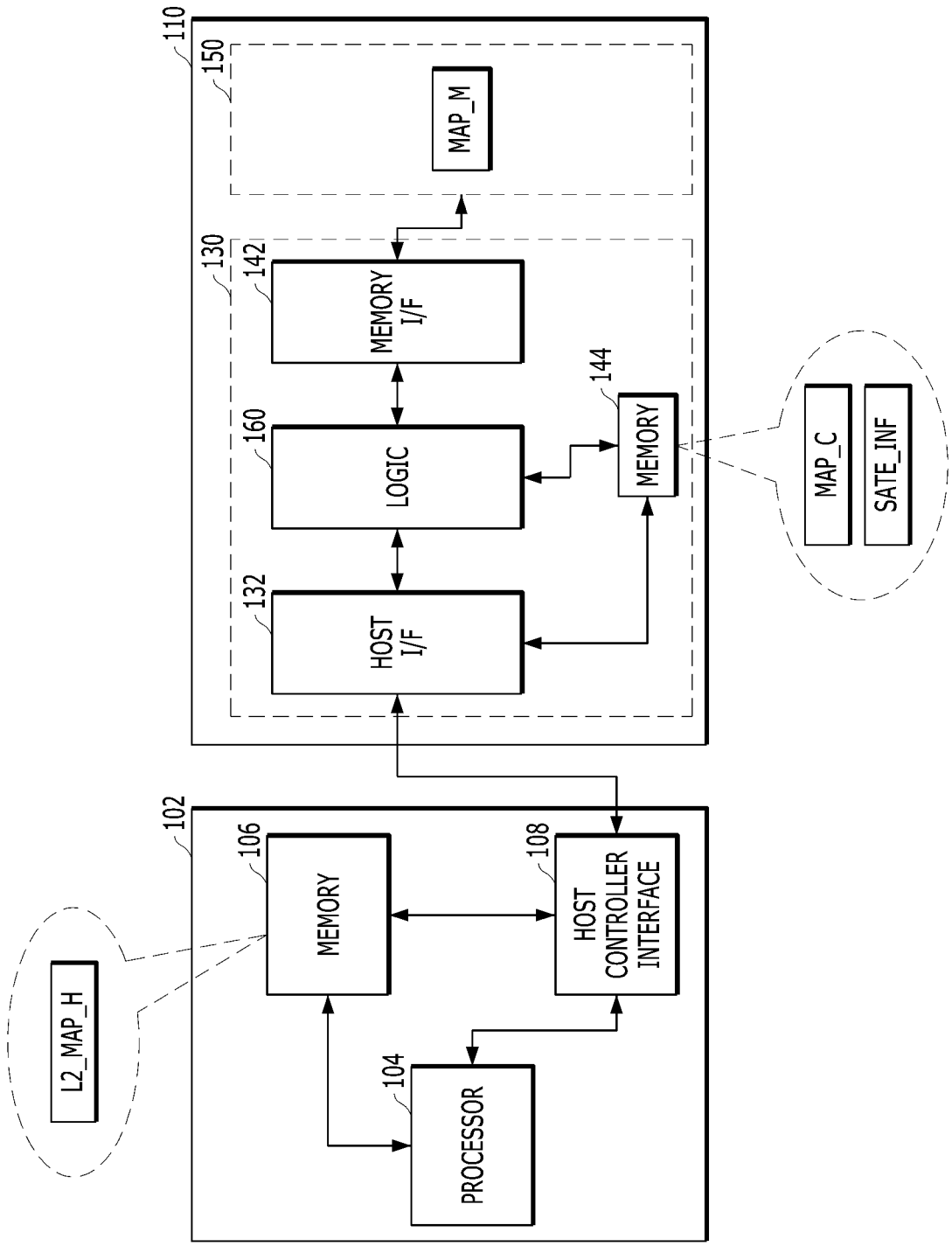
FIG. 7 illustrates a read operation of a host and a memory system in a data processing system according to an embodiment of the present invention.

Referring to FIG. 7, the host 102 may include a processor 104, host memory 106, and a host controller interface 108. The memory system 110 may include a controller 130 and a memory device 150. Herein, the controller 130 and the memory device 150 described with reference to FIG. 7 may correspond to the controller 130 and the memory device 150 described with reference to FIGS. 1 to 2.

FIG. 7 illustrates certain differences with respect to the data processing system shown in FIGS. 1 and 2. Particularly, a logic block 160 in the controller 130 may correspond to the flash translation layer (FTL) 40 described with reference to FIG. 2. However, according to an embodiment, the logic block 160 in the controller 130 may perform an additional function that the flash translation layer (FTL) 40 of FIG. 2 may not perform.

The host 102 may include the processor 104, which has a higher performance than that of the memory system 110. the host 102 also includes the host memory 106 which is capable of storing a greater amount of data than that of the memory system 110 that cooperates with the host 102. The processor 104 and the host memory 106 in the host 102 have an advantage in terms of space and upgradability. For example, the processor 104 and the host memory 106 have less of a space limitation than the processor 134 and the memory 144 in the memory system 110. The processor 104 and the host memory 106 may be replaceable with upgraded versions, which is different than the processor 134 and the memory 144 in the memory system 110. In the embodiment of FIG. 7, the memory system 110 can utilize the resources of the host 102 in order to increase the operation efficiency of the memory system 110.

As an amount of data which can be stored in the memory system 110 increases, an amount of metadata corresponding to the data stored in the memory system 110 also increases. When storage capability used to load the metadata in the memory 144 of the controller 130 is limited or restricted, the increase in an amount of loaded metadata may cause an operational burden on the controller 130. For example, because of the limitation of space or region allocated for metadata in the memory 144 of the controller 130, only some, but not all, of the metadata may be loaded. If the loaded metadata does not include specific metadata for a physical location to which the host 102 intends to access, the controller 130 must store the loaded metadata back into the memory device 150 if some of the loaded metadata has been updated, as well as load the specific metadata for the physical location the host 102 intends to access. These operations should be performed for the controller 130 to perform a read operation or a write operation directed by the host 102, and may degrade performance of the memory system 110.

Storage capability of the host memory 106 in the host 102 may be tens or hundreds of times greater than that of the memory 144 in the controller 130. The memory system 110 may transfer metadata 166 used by the controller 130 to the host memory 106 so that at least some part or portion of the host memory 106 may be accessed by the memory system 110. The part of the host memory 106 accessible by the memory system 110 can be used as a cache memory for address translation required for reading or writing data in the memory system 110. In this case, the host 102 translates a logical address into a physical address based on the metadata 166 stored in the host memory 106 before transmitting the logical address along with a request, a command, or an instruction to the memory system 110. Then, the host 102 can transmit the translated physical address with the request, the command, or the instruction to the memory system 110. The memory system 110, which receives the translated physical address with the request, the command, or the instruction, may skip an internal process of translating the logical address into the physical address and access the memory device 150 based on the physical address transferred. In this case, overhead (e.g., operational burden) of the controller 130 loading metadata from the memory device 150 for the address translation may be reduced or eliminated, and operational efficiency of the memory system 110 can be enhanced.

On the other hand, even if the memory system 110 transmits the metadata 166 to the host 102, the memory system 110 can control mapping information based on the metadata 166 such as metadata generation, erase, update, and the like. The controller 130 in the memory system 110 may perform a background operation such as garbage collection or wear leveling according to an operation state of the memory device 150 and may determine a physical address, i.e., which physical location in the memory device 150 data transferred from the host 102 is to be stored. Because a physical address of data stored in the memory device 150 may be changed and the host 102 has not recognized the changed physical address, the memory system 110 may control the metadata 166 on its own initiative.

While the memory system 110 controls metadata used for the address translation, it can be determined that the memory system 110 needs to modify or update the metadata 166 previously transmitted to the host 102. The memory system 110 can send a signal or metadata to the host 102 so as to request the update of the metadata 166 stored in the host 102. The host 102 may update the stored metadata 166 in the host memory 106 in response to a request delivered from the memory system 110. This allows the metadata 166 stored in the host memory 106 in the host 102 to be kept as the latest version such that, even though the host controller interface 108 uses the metadata 166 stored in the host memory 106, there is no problem in an operation that a logical address is translated into a physical address and the translated physical address is transmitted along with the logical address to the memory system 110.

The metadata 166 stored in the host memory 106 may include mapping information used for translating a logical address into a physical address.

Referring to FIG. 7, metadata associating a logical address with a physical address may include two distinguishable items: a first mapping information item used for translating a logical address into a physical address; and a second mapping information item used for translating a physical address into a logical address. Among them, the metadata 166 stored in the host memory 106 may include the first mapping information. The second mapping information can be primarily used for internal operations of the memory system 110, but might not be used for operations requested by the host 102 to store data in the memory system 110 or read data corresponding to a particular logical address from the memory system 110. In an embodiment, the second mapping information item might not be transmitted by the memory system 110 to the host 102.

The controller 130 in the memory system 110 can control (e.g., create, delete, update, etc.) the first mapping information item or the second mapping information item, and store either the first mapping information item or the second mapping information item to the memory device 150. Because the host memory 106 is a type of volatile memory, the metadata 166 stored in the host memory 106 may disappear when an event such as interruption of power supply to the host 102 and the memory system 110 occurs. Accordingly, the controller 130 in the memory system 110 might not only keep the latest state of the metadata 166 stored in the host memory 106, but also store the latest state of the first mapping information item or the second mapping information item in the memory device 150.

Figure 8A:
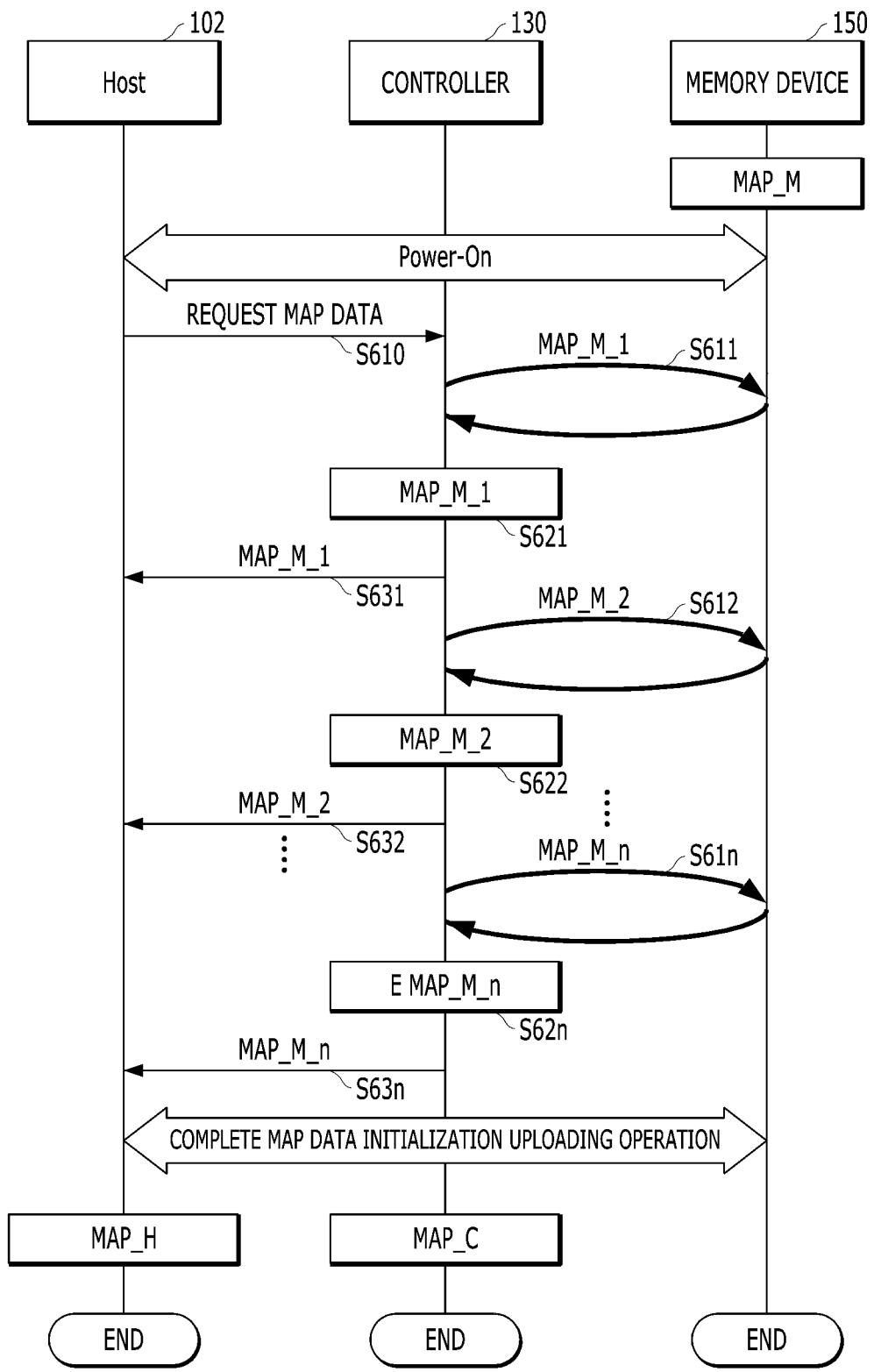
FIG. 8A is a flowchart illustrating a process of initially uploading map data.

FIG. 8A is a flowchart illustrating a method in which the memory system 110 transmits all or a portion of the memory map data MAP_M to the host 102 at power-on. Referring to FIG. 8A, the controller 130 loads some or all of a memory map data MAP_M stored in the memory device 150 and transmits memory map data MAP_M to the host 102 at power-on. Upon power-on, the host 102, the controller 130, and the memory device 150 may start an initial upload of a map data.

In S610, the host 102 may request map data from the controller 130. For example, the host 102 may designate and request a specific portion of the map data. For example, the host 102 may designate and request a portion of the map data, in which data needed to drive the data processing system 100, such as a file system, a boot image, and an operating system, is stored. As another example, the host 102 may request map data from the controller 130 without any designation.

In S611, the controller 130 may read a first portion MAP_M_1 of the memory map data MAP_M from the memory device 150. In S621, the first portion MAP_M_1 may be stored in the controller 130 as the controller map data MAP_C. In S631, the controller 130 may transmit the first portion MAP_M_1, which is stored as the controller map data MAP_C, to the host 102. The first portion MAP_M_1 may be stored in the host memory 106 as the host map data MAP_H.

In S612, the controller 130 may read a second portion MAP_M_2 of the memory map data MAP_M from the memory device 150. In S622, the second portion MAP_M_2 may be stored in the controller 130 as the controller map data MAP_C. In S632, the controller 130 may transmit the second portion MAP_M_2, which is stored as the controller map data MAP_C, to the host 102. The second portion MAP_M_2 may be stored in the host memory 106 as the host map data MAP_H, by the host 102.

The process continues in this sequence. Thus, in S61$n$, the controller 130 may read an $n^{th}$ portion MAP_M_n of the memory map data MAP_M from the memory device 150. In S62$n$, the $n^{th}$ portion MAP_M_n may be stored in the controller 130 as the controller map data MAP_C. In S63$n$, the controller 130 may transmit the $n^{th}$ portion MAP_M_n, which is stored as the controller map data MAP_C, to the host 102. The $n^{th}$ portion MAP_M_n may be stored in the host memory 106 as the host map data MAP_H, by the host 102. Consequently, the host 102, the controller 130, and the memory device 150 may complete the initial upload of the map data.

The controller 130 in FIG. 8A downloads a part of the memory map data MAP_M a plurality of times and uploads the downloaded memory map data MAP_M to the host 102 a plurality of times in response to a single request of map data received from the host 102 in S610. However, the controller 130 may upload all of the memory map data MAP_M to the host 102 in response to a single request of map data received from the host 102. Alternatively, the controller 130 may upload the memory map data MAP_M to the host 102 in parts or pieces in succession in response to respective requests from the host 102.

As described above, the controller map data MAP_C is stored in the memory 144 of the controller 130, and the host map data MAP_H is stored in the host memory 106 of the host 102. Accordingly, the memory map data MAP_M and the controller map data MAP_C which may be referred to as a memory segment and a controller segment, respectively. The host map data MAP_H may be referred to as a host segment.

When the initial upload of the map data is completed, the host 102 may cooperate with the memory system 110 and start accessing the memory system 110. An example is illustrated in FIG. 8A as the host 102 and the memory system 110 perform the initial upload. However, the present invention is not limited to that specific configuration or processing. For example, the initial upload may be omitted. The host 102 may gain access to the memory system 110 without the initial upload.

After the map data initial upload operation, upload and updating the memory map data MAP_M may be performed in response to a host request or may be performed under the control of the controller 130 without a host request. The upload and updating operation of the memory map data MAP_M may be performed in part or in whole, and may be performed at different times, e.g., periodically.

Figure 8B:
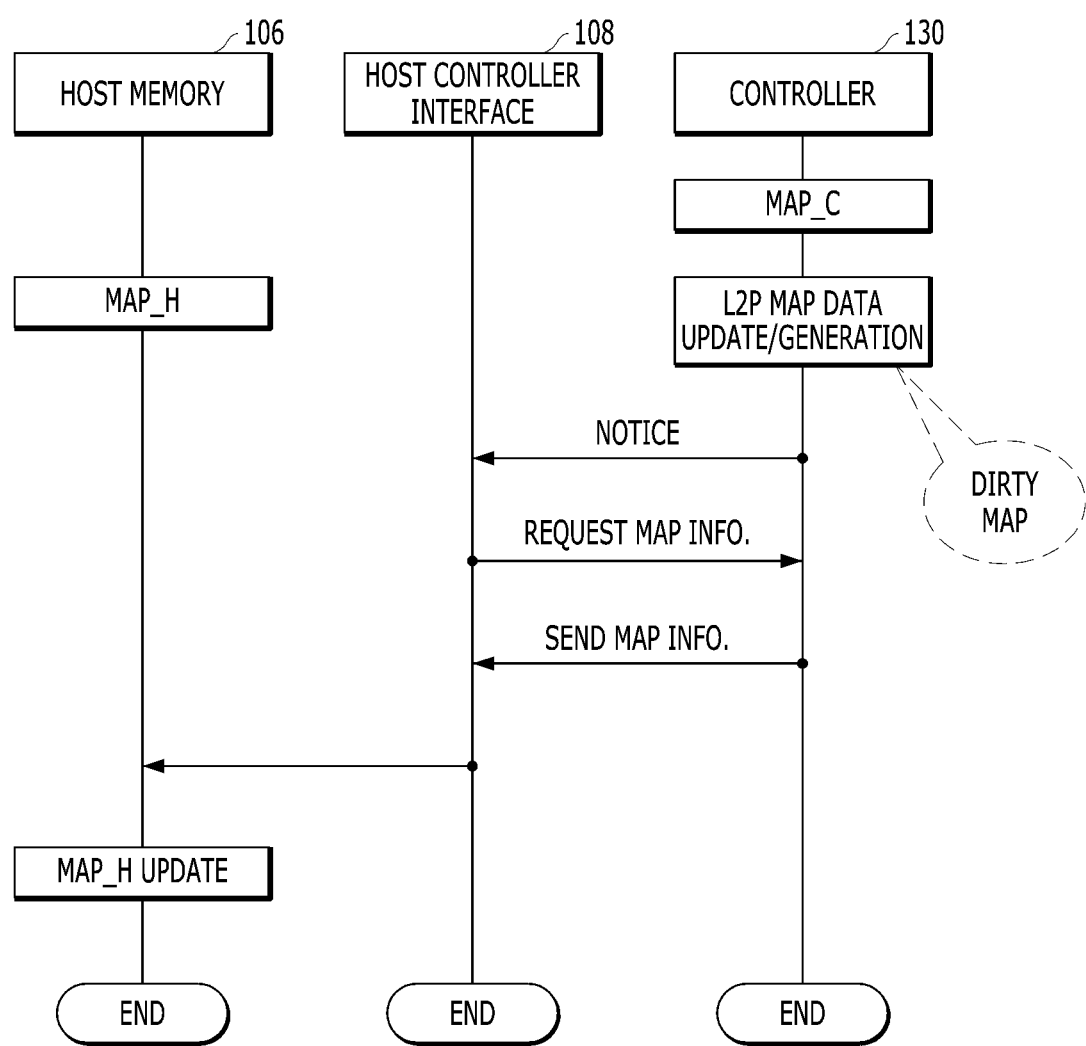
FIG. 8B is a block diagram illustrating a process of updating map data.

FIG. 8B is a block diagram illustrating an example of the map update operation performed by the data processing system illustrated in FIG. 7. Particularly, FIG. 8B illustrates a process of periodically upload memory map data MAP_M to the host 102, and updating the host map data MAP_H which is metadata stored in the host memory 106, under the control of the controller 130.

The memory system 110 operably engaged with the host 102 may perform a read operation, an erase operation and a write operation of data requested by the host 102. After performing the read, erase and write operations of the data requested by the host 102, the memory system 110 may update the metadata when a change in the position of the data in the memory device 150 occurs.

The memory system 110 may update the metadata in response to such change in a process of performing a background operation, for example, a garbage collection operation or a wear-leveling operation, even without the request of the host 102. The controller 130 in the memory system 110 may detect whether the metadata is updated through the above-described operation. In other words, the controller 130 may detect that the metadata has become dirty (i.e., dirty map) while the metadata is generated, updated, erased, etc., and reflect the dirty map in dirty information.

When the metadata gets dirty, the controller 130 transmits a notice, informing a host controller interface 108 of the need to update the host map data MAP_H, to the host controller interface 108. In this case, the notice may be periodically transmitted at regular time intervals or transmitted according to how dirty the metadata has become.

In response to the notice received from the controller 130, the host controller interface 108 may transmit a request for the host map data MAP_H that needs to be updated, to the controller 130 (i.e., request map information). In this case, the host controller interface 108 may designate and request only a portion of the host map data MAP_H that needs to be updated or request all of the host map data MAP_H.

The controller 130 may transmit the metadata, that needs to be updated, in response to the request of the host controller interface 108 (i.e., transmit map information). The host controller interface 108 may transmit the transmitted metadata to the host memory 106, and update the stored host map data MAP_H (i.e., L2P map update).

The memory map data MAP_M stored in the memory device 150 may include mapping information between the physical address PA and the logical address LA of the nonvolatile memory element in the memory device 150 where MAP_M is stored. The memory map data MAP_M may be managed in units of map segments MS. Each of the map segments MS may include a plurality of entries, and each of the entries may include mapping information between consecutive logical addresses LA and consecutive physical addresses PA.

Figure 9A:
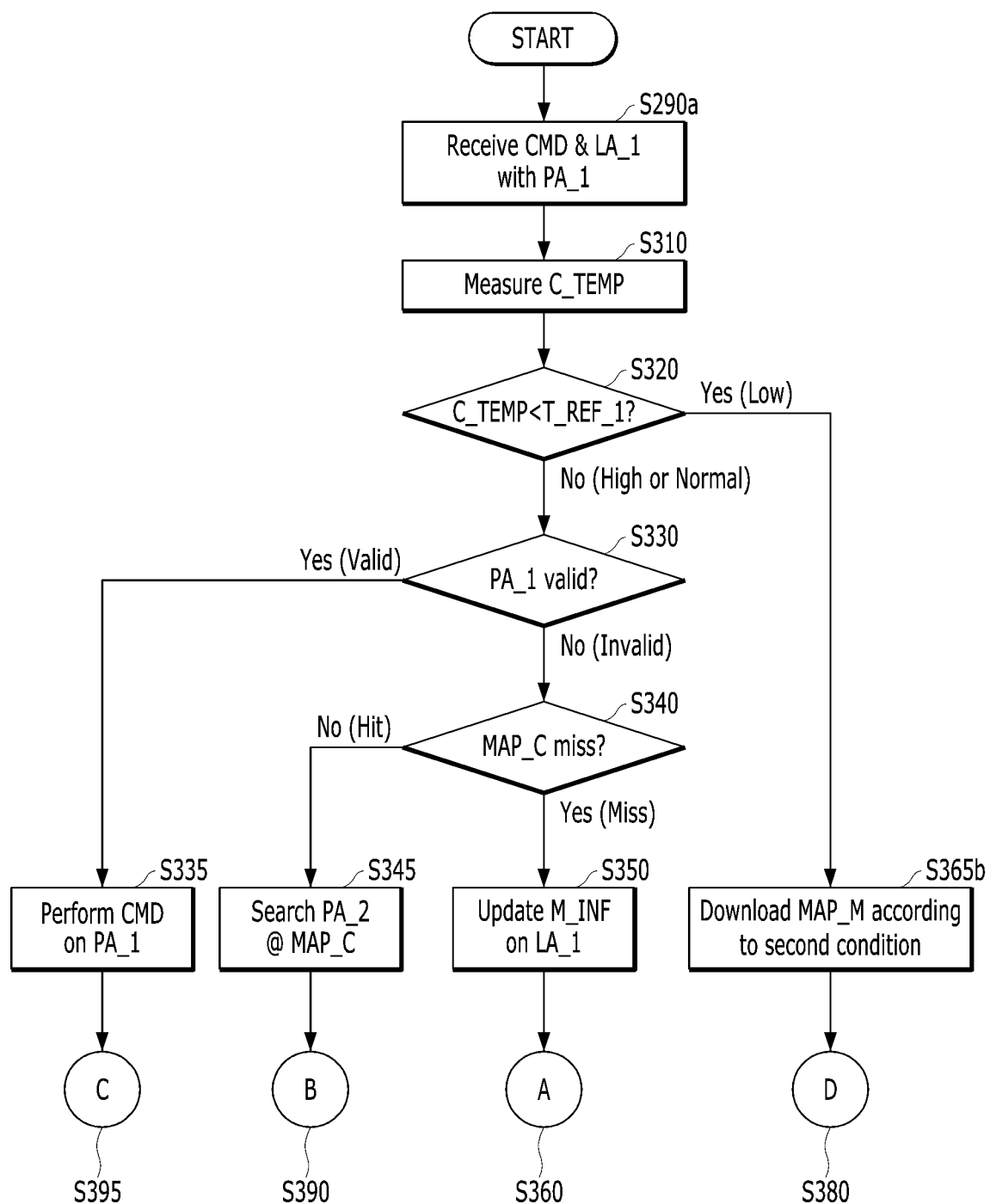
FIGS. 9A and 9B are flowcharts illustrating a method in which the memory system in accordance with an embodiment performs a command operation.
Figure 9B:
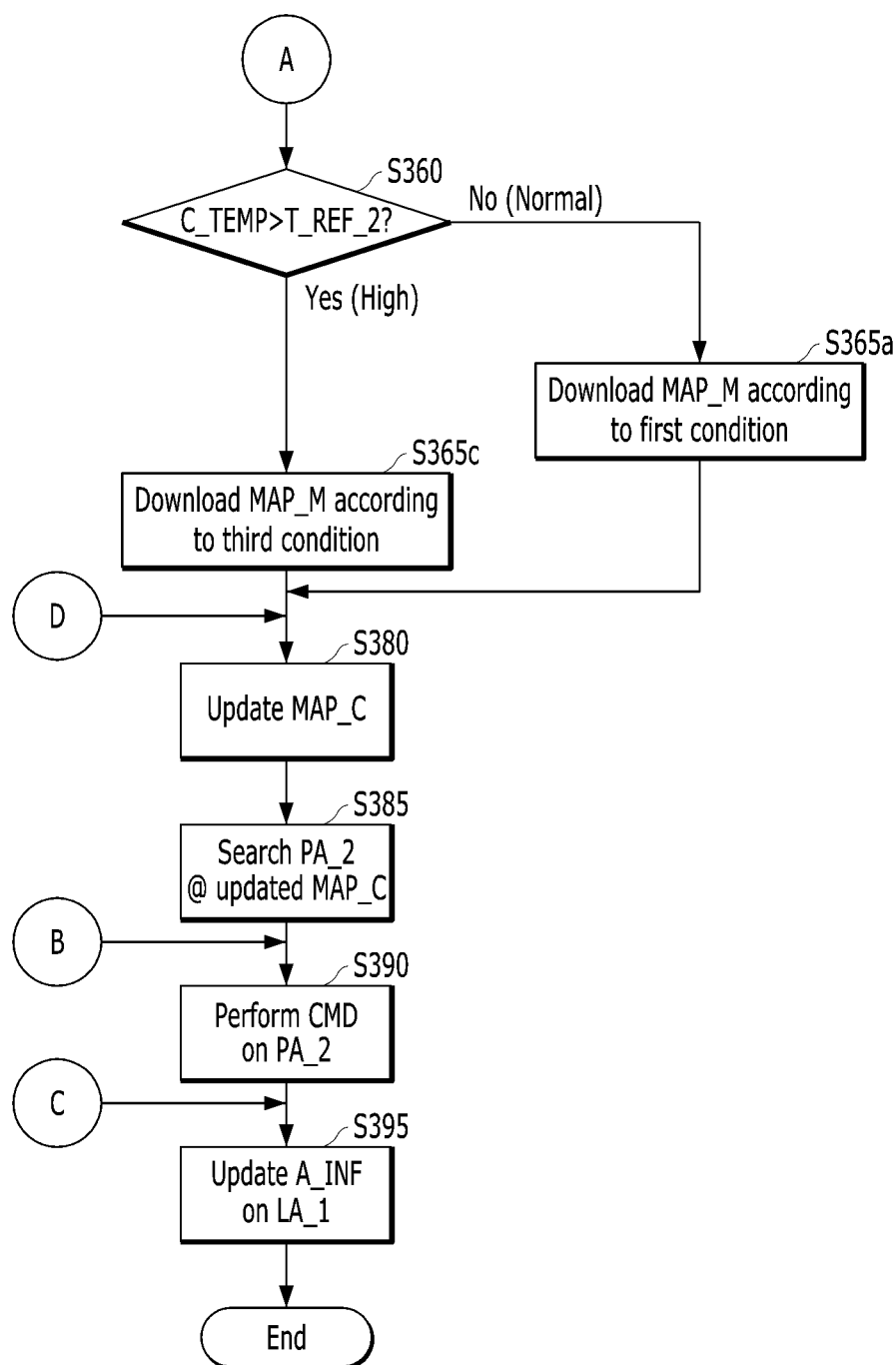

Referring to FIG. 9A, the controller 130 receives the first physical address PA_1 with the command CMD and the first logical address LA_1 in step S290.

The temperature sensor 335 included in the memory device 150 measures the current temperature C_TEMP of the memory device 150 in step S310. The temperature sensor 335 may periodically measure the current temperature C_TEMP of the memory device 150.

In an embodiment, the temperature sensor 335 may measure the current temperature C_TEMP under control of the controller 130. Furthermore, the temperature sensor 335 may provide the measured current temperature C_TEMP to the controller 130.

Then, the controller 130 determines whether the current temperature C_TEMP is lower than the first reference temperature T_REF_1, in step S320. The first reference temperature T_REF_1 may be preset and stored in the controller 130.

When the determination result of step S320 indicates that the current temperature C_TEMP is lower than the first reference temperature T_REF_1 (Yes in step S320), the controller 130 determines that the current temperature C_TEMP of the memory device 150 is included in the low temperature range. When the current temperature C_TEMP is included in the low temperature range, the controller 130 may determine that the temperature of the memory device 150 is so low that an error occurred during a program or read operation on the memory device 150. In this case, the controller 130 may perform the map download for the memory map data MAP_M according to the second performance condition in step S365*b*.

When the determination result of step S320 indicates that the current temperature C_TEMP is not lower than the first reference temperature T_REF_1 (No in step S320), the controller 130 determines that the current temperature C_TEMP of the memory device 150 is included in the high temperature range or the normal temperature range.

Then, the controller 130 determines whether the first physical address PA_1 received in step S305 is valid, in step S330. The controller 130 may determine the validity of the first physical address PA_1 using the dirty information D_INF of the L2P map segment L2P_MS including the first logical address LA_1. Furthermore, the controller 130 may determine the validity of the first physical address PA_1 using invalid address information INV_INF of a P2L map segment sub region P2L_MS including the first physical address PA_1.

In the present embodiment, the dirty information D_INF may include information on whether the storage position of data corresponding to the logical address LA has been changed. That is, the dirty information D_INF may indicate whether the physical address PA corresponding to the first logical address LA_1 has been changed. The invalid address information INV_INF may include information on a physical address which has been invalidated by a change in the storage position of the data corresponding to the logical address LA, an erase operation, or an unmapping operation for the physical address PA corresponding to the logical address LA.

When the determination result of step S330 indicates that the first physical address PA_1 is valid (Yes in step S330), the controller 130 performs a command operation on the first physical address PA_1 in step S335. Then, the controller 130 updates the access information A_INF by increasing the state value of the access information A_INF on the first logical address LA_1 by 1 in step S395.

The access information A_INF may include information on whether the host 102 has accessed the logical address LA or the number of times that the host 102 accesses the logical address LA. The access information A_INF may be configured in the form of a counter that has the initial value of a first level (for example, 0), and is increased whenever an access of the host 102 to a specific logical address LA is requested.

When the determination result of step S330 indicates that the first physical address PA_1 is not valid (No in step S330), the controller 130 determines that the first physical address PA_1 is invalid. Then, the controller 130 performs an operation for searching for a valid second physical address PA_2 in order to perform the command operation for the first logical address LA_1 on the valid second physical address PA_2.

For this operation, the controller 130 determines whether a map miss occurred between the first logical address LA_1 and the controller map data MAP_C, in step S340. The controller 130 determines whether map data for the first logical address LA_1 are included in the controller map data MAP_C_1 stored in the memory 144.

When the determination result of step S340 indicates that the map data for the first logical address LA_1 are included in the controller map data MAP_C (No in step S340), the controller 130 determines that a map hit, not a map miss, occurred between the first logical address LA_1 and the controller map data MAP_C. Thus, the controller 130 acquires the second physical address PA_2 by searching the controller map data MAP_C, the second physical address PA_2 being a valid physical address corresponding to the first logical address LA_1, in step S345. Then, the controller 130 performs a command operation on the acquired second physical address PA_2 in step S390. Then, the controller 130 updates the access information A_INF by increasing the state value of the access information A_INF on the first logical address LA_1 by 1 in step S395.

When the determination result of step S340 indicates that the map data for the first logical address LA_1 are not included in the controller map data MAP_C (Yes in step S340), the controller 130 determines that a map miss occurred between the first logical address LA_1 and the controller map data MAP_C. The controller 130 updates the map miss information M_INF on the first logical address LA_1 by increasing the state value of the map miss information M_INF by 1 in step S350. In the present embodiment, the map miss information M_INF may include the number of times that a map miss occurs. The map miss information M_INF may be configured in the form of a counter which has the initial value of the first level (for example, 0) and is increased whenever a map miss occurs.

The controller 130 determines whether the current temperature C_TEMP measured in step S310 is lower than a second reference temperature T_REF_2, in step S360. The second reference temperature T_REF_2 may correspond to the highest temperature in the normal temperature range indicating the normal operation temperature range of the memory system 110. The second reference temperature T_REF_2 may be preset and stored in the controller 130.

When the determination result of step S360 indicates that the current temperature C_TEMP is higher than the second reference temperature T_REF_2 (Yes in step S360), the controller 130 determines that the current temperature C_TEMP of the memory device 150 is included in the high temperature range. When the current temperature C_TEMP is included in the high temperature range, the controller 130 may perform the map download for the memory map data MAP_M according to the third performance condition in step S365c.

When the determination result of step S360 indicates that the current temperature C_TEMP is not higher than the second reference temperature T_REF_2, the controller 130 determines that the current temperature C_TEMP of the memory device 150 is included in the normal temperature range. When the current temperature C_TEMP is included in the normal temperature range, the controller 130 may perform the map download for the memory map data MAP_M according to the first performance condition in step S365a.

In steps S365a, S365b and S365c, the controller 130 may request the memory map data MAP_M from the memory device 150, the memory map data MAP_M including map data for the first logical address LA_1. The memory device 150 may transmit the memory map data MAP_M including the map data for the first logical address LA_1 to the controller 130 according to a map download request of the controller 130.

Then, the controller 130 stores the memory map data MAP_M, downloaded from the memory device 150 in steps S365a, S365b and S365c, as the controller map data MAP_C in the memory 144. In this way, the controller map data MAP_C may be updated by the map download in step S380.

The controller 130 acquires the second physical address PA_2 for the first logical address LA_1 by searching the controller map data MAP_C_2 updated in step S380, in step S385. Then, the controller 130 performs the command operation on the acquired second physical address PA_2 in step S390.

Then, the controller 130 updates the access information A_INF by increasing the state value of the access information A_INF on the first logical address LA_1 by 1 in step S395.

The map download for the map data, which is performed under different performance conditions depending on the current temperature C_TEMP in steps S365a, S365b and S365c, may be performed according to the method described with reference to FIGS. 1A and 1B.

Figure 10A:
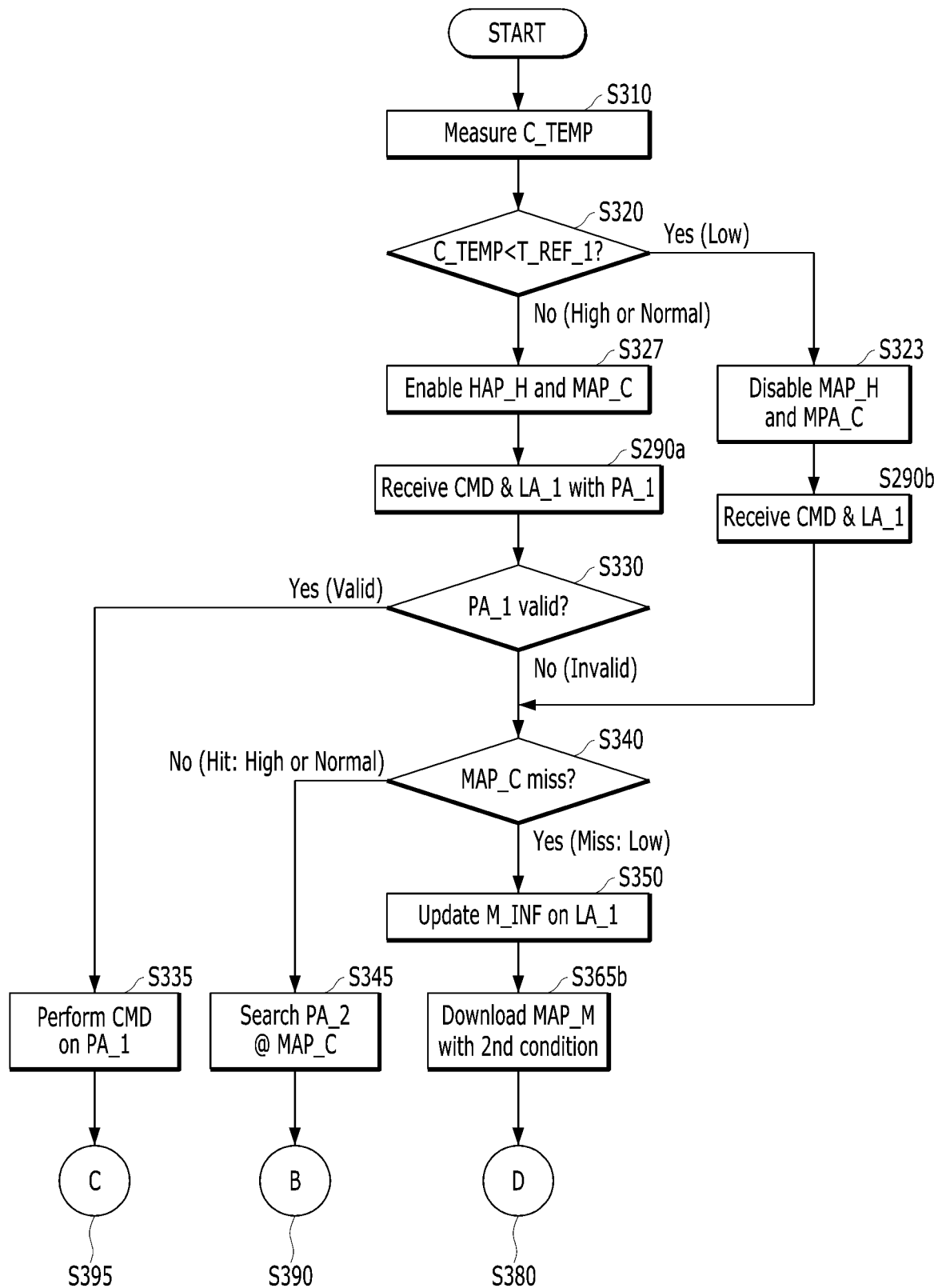
FIGS. 10A and 10B are flowcharts illustrating a method in which the memory system in accordance with an embodiment performs a command operation.
Figure 10B:
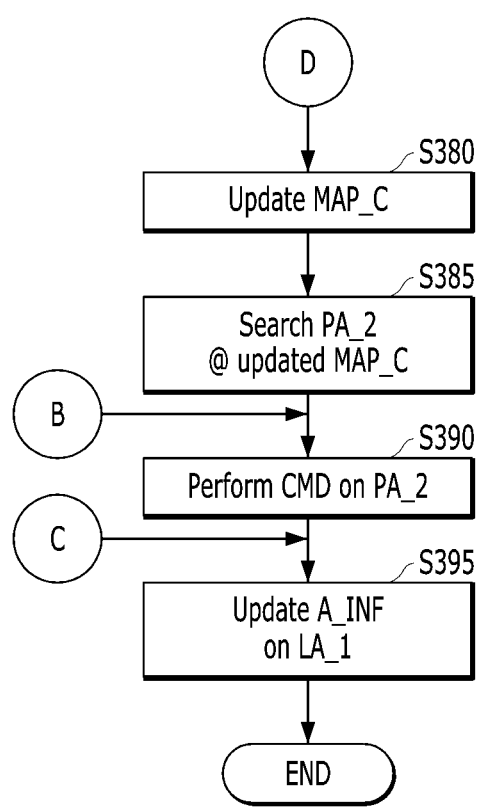

Hereafter, referring to FIGS. 7, 10A and 10B, a method in which a memory system in accordance with an embodiment controls temperature thereof while performing a command operation is described. FIGS. 10A and 10B are flowcharts illustrating a method in which the memory system in accordance with the present embodiment performs a command operation.

In particular, in the present embodiment illustrated in FIGS. 10A and 10B, the controller 130 may disable the controller map data MAP_C and the host map data MAP_H in order to raise the map miss ratio, when the current temperature C_TEMP of the memory device 150 is within the low temperature range. In this case, the host 102 transmits only the command CMD and the first logical address LA_1 to the controller 130 without the first physical address PA_1. Then, a map miss occurs during the command operation of the controller 130, and the controller 130 performs the map download to raise the temperature of the memory system 110.

Referring to FIG. 10A, the temperature sensor 335 included in the memory device 150 measures the current temperature C_TEMP of the memory device 150 in step S310. The temperature sensor 335 may periodically measure the current temperature C_TEMP of the memory device 150. In an embodiment, the temperature sensor 335 may measure the current temperature C_TEMP under control of the controller 130. Furthermore, the temperature sensor 335 may provide the measured current temperature C_TEMP to the controller 130.

Thus, the controller 130 determines whether the current temperature C_TEMP is lower than the first reference temperature T_REF_1, in step S320. The first reference temperature T_REF_1 may correspond to the lowest temperature in the normal temperature range indicating the normal operation temperature range of the memory system 100. The first reference temperature T_REF_1 may be preset and stored in the controller 130.

When the determination result of step S320 indicates that the current temperature C_TEMP is lower than the first reference temperature T_REF_1 (Yes in step S320), the controller 130 determines that the current temperature C_TEMP of the memory device 150 is included in the low temperature range. Thus, the controller 130 disables the host map data MAP_H stored in the host memory 106 and the controller map data MAP_C stored in the memory 144 in step S323. Since this process has already been described with reference to FIGS. 3, 4A and 4B, description thereof is omitted here.

In this case, since portions of the host map data MAP_H, corresponding to the controller map data MAP_C, are disabled, the host 102 transmits only the command CMD and the first logical address LA_1 to the controller 130 without the first physical address PA_1. Thus, the controller 130 receives only the command CMD and the first logical address LA_1 from the host 102 in step S290b. Then, the controller 130 performs step S340.

When the determination result of step S320 indicates that the current temperature C_TEMP is not lower than the first reference temperature T_REF_1 (No in step S320), the controller 130 determines that the current temperature C_TEMP of the memory device 150 is included in the high temperature range or the normal temperature range. In this case, the controller 130 enables the host map data MAP_H stored in the host memory 106 and the controller map data MAP_C stored in the memory 144 in step S327. Since to this process has already been described with reference to FIGS. 3, 4C and 4D, description thereof is omitted here.

In this case, since portions of the host map data MAP_H, corresponding to the controller map data MAP_C, are enabled, the host 102 transmits the first physical address PA_1 with the command CMD and the first logical address LA_1 to the controller 130. Thus, the controller 130 receives the first physical address PA_1 with the command CMD and the first logical address LA_1 from the host 102 in step S290a.

After step S290a, the controller 130 determines whether the first physical address received in step S290a is valid, in step S330. The controller 130 may determine the validity of the first physical address PA_1 using the dirty information D_INF of the L2P map segment L2P_MS including the first logical address LA_1. Furthermore, the controller 130 may determine the validity of the first physical address PA_1 using the invalid address information INV_INF of the P2L map segment sub region P2L_MS including the first physical address PA_1.

When the determination result of step S330 indicates that the first physical address PA_1 is valid (Yes in step S330), the controller 130 performs the command operation on the first physical address PA_1 in step S335. Then, the controller 130 updates the access information A_INF by increasing the state value of the access information A_INF on the first logical address LA_1 by 1 in step S395.

When the determination result of step S330 indicates that the first physical address PA_1 is not valid (No in step S330), the controller 130 determines that the first physical address PA_1 is invalid. Then, the controller 130 performs an operation for searching for and acquiring a valid second physical address PA_2 in order to perform the command operation for the first logical address LA_1 on the valid second physical address PA_2.

For this operation, the controller 130 determines whether a map miss occurred between the first logical address LA_1 and the controller map data MAP_C, in step S340. The controller 130 determines whether map data for the first logical address LA_1 are included in the controller map data MAP_C stored in the memory 144, in step S340.

When the current temperature C_TEMP measured in step S310 is within the normal temperature range or the high temperature range, the map data corresponding to the host map data MAP_H and the controller map data MAP_C are all enabled in step S327. Therefore, the map data for the first logical address LA_1 received by the controller 130 in step S305 are included in the controller map data MAP_C (No in step S340). Thus, the controller 130 determines that a map hit occurred between the first logical address LA_1 and the controller map data MAP_C (No in step S340). In the present embodiment, according to the determination result of step S340 a map hit may occur only when the current temperature C_TEMP is higher than the first reference temperature T_REF_1.

The controller 130 acquires the second physical address PA_2 for the first logical address LA_1 by searching the controller map data MAP_C_1 in step S345. Then, the controller 130 performs the command operation on the acquired second physical address PA_2 in step S390. Then, the controller 130 updates the access information A_INF by increasing the state value of the access information A_INF on the first logical address LA_1 by 1 in step S395.

When the current temperature C_TEMP measured in step S310 is within the low temperature range, the map data corresponding to the host map data MAP_H and the controller map data MAP_H are all disabled in step S327. Therefore, the map data for the first logical address LA_1 received by the controller 130 in step S305 are not included in the controller map data MAP_C_1 (Yes in step S340). Thus, the controller 130 determines that a map miss occurred between the first logical address LA_1 and the controller map data MAP_C (Yes in step S340). Then, the controller 130 updates the map miss information M_INF on the first logical address LA_1 by increasing the state value of the map miss information M_INF by 1 in step S350. In the present embodiment, according to the determination result of step S340, a map miss may occur only when the current temperature C_TEMP is lower than the first reference temperature T_REF_1.

After step S350, the controller 130 performs the map download for the memory map data MAP_M in step S365b. The controller 130 may request the memory map data MAP_M including the map data for the first logical address LA_1 from the memory device 150. The memory device 150 may transmit the memory map data MAP_M including the map data for the first logical address LA_1 to the controller 130 according to the map download request of the controller 130.

Referring to FIG. 10B, the controller 130 stores the memory map data MAP_M downloaded from the memory device 150 as the controller map data MAP_C_1 in the memory 144. In this way, the controller map data MAP_C_1 may be updated into the controller map data MAP_C_2 by the map download in step S380.

The controller 130 acquires the second physical address PA_2 for the first logical address LA_1 by searching the controller map data MAP_C_2 updated in step S380, in step S385. Then, the controller 130 performs the command operation on the acquired second physical address PA_2 in step S390.

Then, the controller 130 updates the access information A_INF by increasing the state value of the access information A_INF on the first logical address LA_1 by 1 in step S395.

Figure 11A:
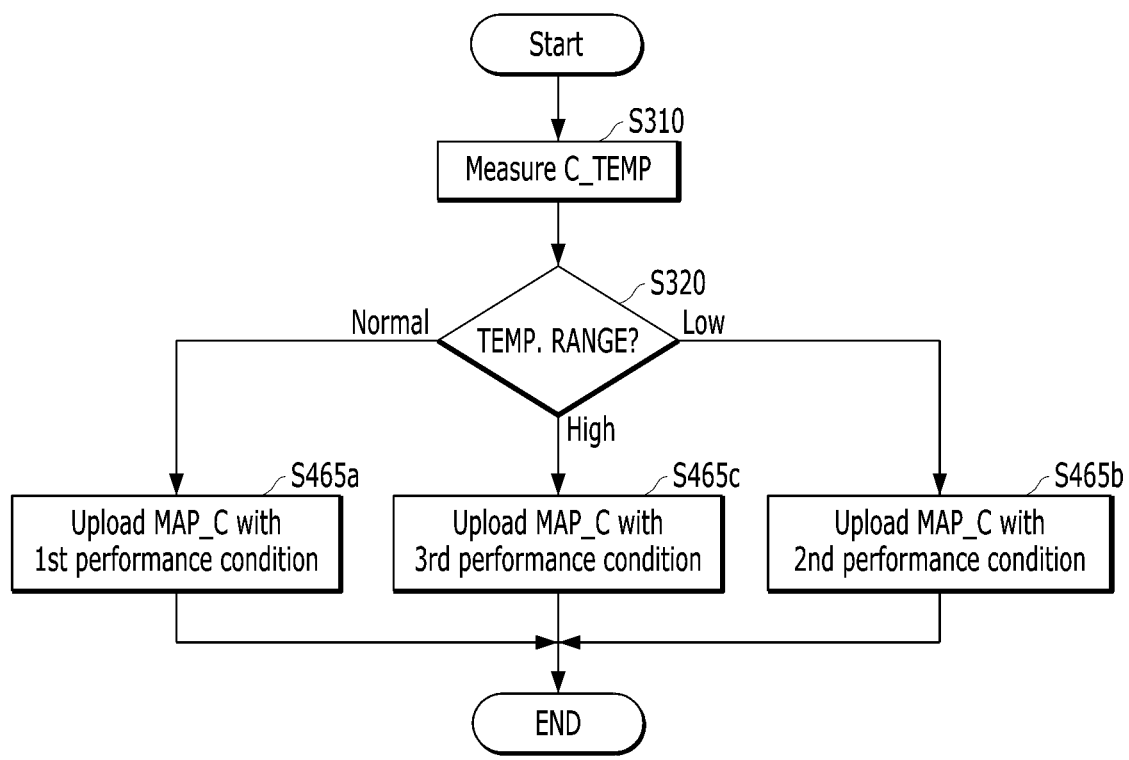

Hereafter, referring to FIGS. 11A and 11B, a method in which the memory system 110 in accordance with the present embodiment controls the temperature of the memory device 150 is described. FIGS. 11A and 11B are a flowchart and table for describing the method in which the memory system 110 in accordance with the present embodiment performs the map upload. In the present embodiment, the map upload may accompany the map download.

The temperature sensor 335 measures the current temperature C_TEMP of the memory device 150 in step S310. The controller 130 determines a temperature range to which the measured current temperature C_TEMP belongs, in step S320a. When the current temperature C_TEMP is within the normal temperature range, the controller 130 performs the map upload for the controller map data MAP_C according to the first performance condition in step S465a. When the current temperature C_TEMP is within the low temperature range, the controller 130 performs the map upload for the controller map data MAP_C according to the second performance condition in step S465b. When the current temperature C_TEMP is within the high temperature range, the controller 130 performs the map upload for the controller map data MAP_C according to the third performance condition in step S465c. Each of the first to third performance conditions may include a performance period and a performance target.

The map uploads performed in steps S465a, S465b and S465c in FIG. 11A may be performed under the lead of the controller 130, without an interactive operation between the memory system 110 and the host. The controller 130 may set each of the first to third performance conditions, which are differently set depending on the current temperature C_TEMP, to a fixed performance period and a fixed performance target.

For example, when the current temperature C_TEMP is within the normal temperature range, the controller 130 may perform the map upload according to the first performance condition. The first performance condition may include a fixed performance period (for example, 12 hours) and a fixed performance target (50% of controller memory capacity). Furthermore, when the current temperature C_TEMP is within the low temperature range, the controller 130 may perform the map upload according to the second performance condition. The second performance condition may include a fixed performance period (for example, 30 seconds) and a fixed performance target (100% of map cache memory capacity). Furthermore, when the current temperature C_TEMP is within the high temperature range, the controller 130 may perform the map upload according to the third performance condition. The third performance condition may include a fixed performance period (for example, 24 hours) and a fixed performance target (10% of map cache memory capacity).

The map uploads performed in steps S465a, S465b and S465c in FIG. 11A may be performed under the lead of the controller 130, based on the state information STATE_INF of the map data updated by an interactive operation between the memory system 110 and the host. The controller 130 may set the performance period and performance target of the map upload according to the current temperature C_TEMP and the state information STATE_INF.

In the present embodiment, the map upload includes an operation in which the memory system 110 transmits the controller map data stored in the memory to the host 102. The uploaded controller map data MAP_C may be stored as the host map data MAP_H in the host memory 106.

When the current temperature C_TEMP is within the normal temperature range, the controller 130 may perform the map upload in the case that the state value of the access information A_INF is equal to or more than 10 times (performance period). Then, the controller 130 may upload 50% of the L2P controller map data L2P_MAP_C (performance target of 50%).

When the current temperature C_TEMP is within the low temperature range, the controller 130 may perform the map upload in the case that the state value of the access information A_INF is equal to or more than 2 times (performance period). Then, the controller 130 may upload 100% of the L2P controller map data L2P_MAP_C (performance target of 100%).

Hereafter, a method in which the memory system 110 in accordance with the present embodiment controls the temperature of the memory device 150 using the map miss information M_INF included in the state information STATE_INF is described.

When the current temperature C_TEMP is within the normal temperature range, the memory system 110 may perform the map upload in the case that the state value of the map miss information M_INF is equal to or more than 10 times (performance period). Then, the memory system 110 may upload L2P memory map data L2P_MAP_M corresponding to 50% of L2P controller map data L2P_MAP_C (performance target of 50%).

When the current temperature C_TEMP is within the low temperature range, the memory system 110 may perform the map upload in the case that the state value of the map miss information M_INF is equal to or more than one time (performance period). Then, the memory system 110 may upload L2P memory map data L2P_MAP_M corresponding to 100% of L2P controller map data L2P_MAP_C (performance target of 100%).

When the current temperature C_TEMP is within the high temperature range, the memory system 110 may perform the map upload in the case that the state value of the map miss information M_INF is equal to or more than 130 times (performance period). Then, the memory system 110 may upload L2P memory map data L2P_MAP_M corresponding to 10% of L2P controller map data L2P_MAP_C (performance target of 10%).

When the state value of the map miss information M_INF indicating the map miss count is '35' and the current temperature C_TEMP is within the normal temperature range (performance period of 10 times or more) and the low temperature range (performance period of one time or more), the memory system 110 performs the map upload. In the high temperature range (performance period of 30 times or more), however, the memory system 110 does not perform the map upload.

When the current temperature C_TEMP is within the high temperature range, the controller 130 may perform the map upload in the case that the state value of the access information A_INF is equal to or more than 50 times (performance period). Then, the controller 130 may upload 10% of the L2P controller map data L2P_MAP_C (performance target of 10%).

That is, the memory system 110 in accordance with the present embodiment may differently set the performance condition of the map upload according to the current temperature C_TEMP of the memory device, and thus induce a temperature rise or drop of the memory device when the current temperature C_TEMP of the memory device is within the low or high temperature range. Therefore, the memory system 110 in accordance with the present embodiment can effectively reduce a malfunction of the memory device and an occurrence of data corruption, and improve the reliability of data stored therein.

Figure 12:
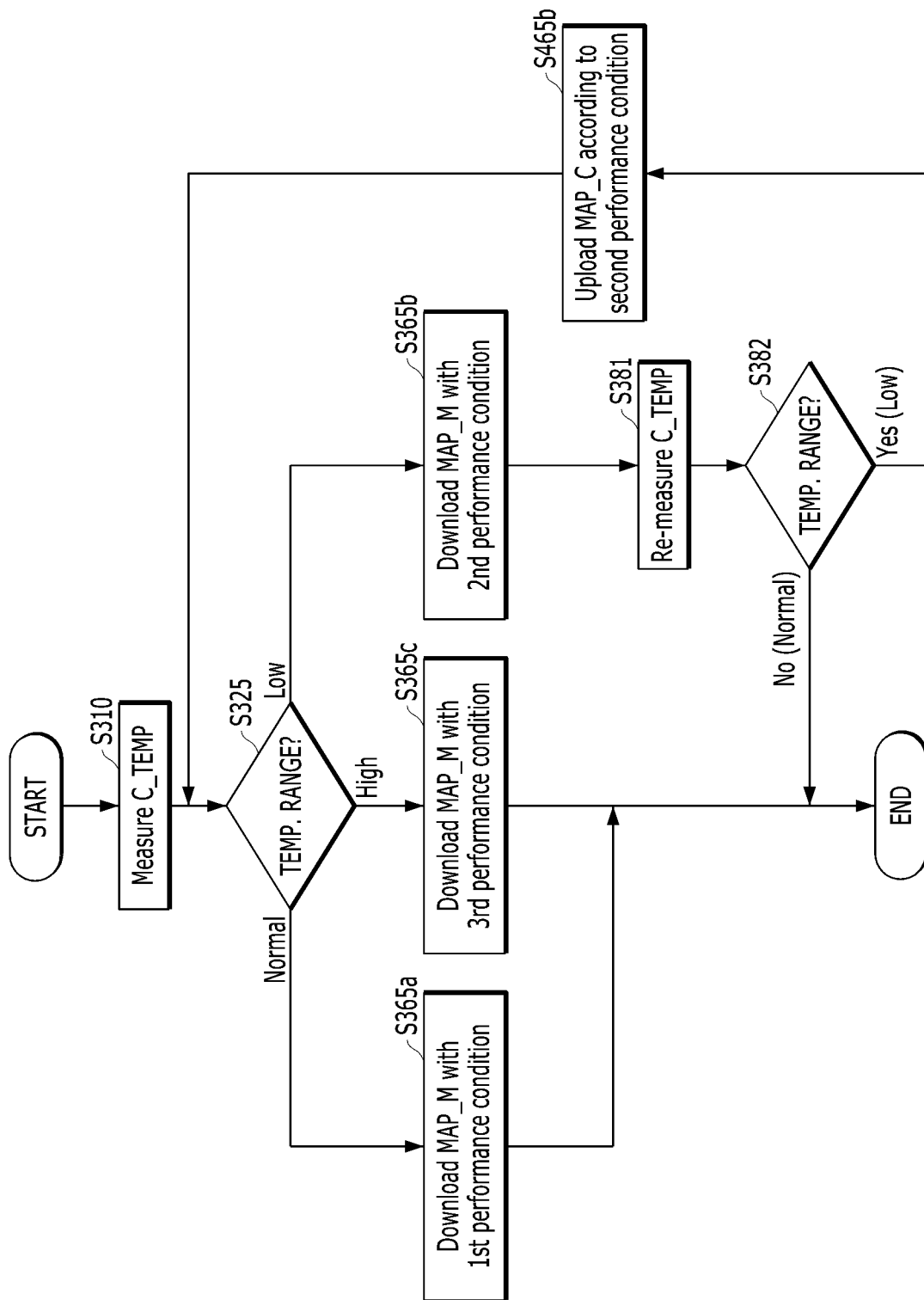
FIG. 12 is a flowchart illustrating a method in which the memory system in accordance with an embodiment controls temperature thereof through the map upload and the map download.

FIG. 12 is a flowchart illustrating a method in which the memory system in accordance with the present embodiment controls temperature thereof through the map upload and the map download.

In particular, FIG. 12 illustrates an example in which the controller 130 remeasures the current temperature C_TEMP of the memory device 150 in step S381, after controlling the temperature of the memory system through the map download illustrated in FIGS. 2A and 2B. The controller 130 determines a temperature range to which the current temperature C_TEMP measured in step S381 belongs, in step S382. When the current temperature C_TEMP measured in step S381 is within the low temperature range, the controller 130 uploads the controller map data MAP_C to the host 102 in step S465b.

When the determination result of step S382 indicates that the current temperature C_TEMP is not lower than the first reference temperature T_REF_1 (No in step S382), the controller 130 determines that the current temperature C_TEMP of the memory device was out of the low temperature range due to the map upload performed in step S365b according to the second performance condition.

As such, in the present embodiment illustrated in FIG. 12, the performance condition including the performance period and performance target of the map download may be changed according to the current temperature C_TEMP, thereby improving the reliability of the memory system 110.

When the current temperature C_TEMP of the memory system 110 illustrated in FIG. 12 is within the low temperature range, the memory system 110 may additionally perform the map upload, such that the temperature of the memory system 110 rises rapidly to be within the normal temperature range. In the present embodiment, the map upload may accompany the map download.

As described above, it is possible to improve the data reliability of the memory device based on the different embodiments which have been described with reference to FIGS. 2A and 2B, FIG. 3, FIGS. 9A and 9B, FIGS. 10A and 10B, FIGS. 11A and 11B and FIG. 12.

For this configuration, the memory system 110 in accordance with the present embodiment differently sets the performance conditions of the map upload and the map download depending on the temperature of the memory device 150, and induces a temperature rise or drop of the memory device 150 such that the temperature of the memory device 150 returns to the normal temperature range. In this way, the memory system 110 in accordance with the present embodiment can effectively prevent, or reduce occurrence of, malfunction of the memory device 150 and data corruption, and thus improve the reliability of data stored therein.

In accordance with the present embodiments, the memory system and the method for controlling temperature thereof can induce a rise or drop in the temperature of the memory cell array by controlling the map download and/or the map upload when the temperature of the memory device is outside of the normal temperature range, thereby improving the performance and data reliability of the memory device.

Furthermore, the memory system and the method for controlling temperature thereof may differently set the performance condition of the map download or the map upload according to the temperature of the memory device, such that the temperature of the memory device is maintained in, or returns to, the normal temperature range. Therefore, the memory system can avoid the degradation in performance and data reliability of the memory device.

Furthermore, when the temperature of the memory device is within the low temperature range, the memory system and the method for controlling temperature thereof may additionally perform the map download or the map upload or advance the performance time of the map download or the map upload, and thus raise the temperature of the memory device such that the temperature of the memory device returns to the temperature range in which the memory system can normally operate. Thus, the memory system can effectively improve the performance and data reliability of the memory device.

Furthermore, the memory system can control the internal temperature thereof even in an environment where the ambient temperature tends to rise like in a data center where a large amount of data is stored and processed, or in an environment where high temperature of an outside environment may change like in a vehicle, thereby maintaining the operation stability of the memory system.

Furthermore, the memory system, the data processing system and the method for controlling temperature thereof can generate and update the state information of the map data for each map segment of the map data, thereby improving the efficiency of the map data management.

Furthermore, in the memory system, the data processing system and the method for controlling temperature thereof, the memory device can perform a command operation in response to a physical address received with a command from an external device, thereby reducing overhead of the memory system which is caused by unnecessary L2P translation. Therefore, the performance speed of the command operation of the memory system and the efficiency of the command operation can be improved.

Furthermore, when the physical address of data stored in the memory system is changed, the memory system, the data processing system and the method for controlling temperature thereof can change the value of the state information of the map data which are stored in the memory system and configured in the form of a bitmap, flag, table or list, and write information on whether the physical address of data for a specific logical address has been changed and invalid address information, thereby improving map data management.

Furthermore, the memory system, the data processing system and the method for controlling temperature thereof can determine the validity of a physical address received with a command from an external device using the state information of the map data without separate map data search. Therefore, the speed of the validity determination operation for the physical address can be improved, and the speed of the command operation can be improved.

Furthermore, the memory system, the computing device or the data processing system including the host can efficiently control the map upload, thereby reducing overhead which may occur during data transmission between the memory system and the computing device within the data processing device or between the hosts.

Although various embodiments have been illustrated and described, it will be apparent to those skilled in the art that various changes and modifications may be made without departing from the spirit and scope of the invention as defined in the following claims. The present invention encompasses all such changes and modifications that fall within the claims.

What is claimed is:

1. A method for controlling temperature of a memory system which includes a memory device suitable for storing memory map data including a logical address of an external device and a physical address of the memory device, the physical address corresponding to the logical address; and a controller suitable for storing at least a part of the memory map data as controller map data, and performing a map upload on at least a part of the controller map data as host map data to the external device, the method comprising:
   measuring temperature of the memory device;
   performing a map download for the memory map data from the memory device according to the measured temperature; and
   disabling a part of the host map data corresponding to the controller map data, and the controller map data, when the measured temperature is lower than the lowest temperature of a normal operation temperature range of the memory system.

2. The method of claim 1, wherein the map download is performed in response to the measured temperature.

3. The method of claim 2, wherein the performing of the map download comprises:
   performing the map download according to a first condition of performance conditions, when the measured temperature is within a normal operation temperature range of the memory system;
   performing the map download according to a second condition of the performance conditions, when the measured temperature is within a low temperature range lower than the normal operation temperature range; or
   performing the map download according to a third condition of the performance conditions, when the measured temperature is within a high temperature range higher than the normal operation temperature range.

4. The method of claim 3, wherein the map download is performed according to the second condition such that a number of downloads of the memory map data during the map download according to the second condition is greater than a number of downloads of the memory map data during the map download according to the first condition.

5. The method of claim 3, wherein the map download is performed according to the third condition such that a number of downloads of the memory map data during the map download according to the third condition is smaller than a number of downloads of the memory map data during the map download according to the first condition.

6. The method of claim 3, wherein the map download is performed according to the second condition such that duration of the map download according to the second condition is greater than duration of the map download according to the first condition.

7. The method of claim 3, wherein the map download is performed according to the third condition such that duration of the map download according to the third condition is shorter than duration of the map download according to the first condition.

8. The method of claim 3, wherein the map download is performed according to the second condition such that heat generated during the map download according to the second condition is greater than heat generated during the map download according to the first condition.

9. The method of claim 3, wherein the map download is performed according to the third condition such that heat generated during the map download according to the third condition is smaller than heat generated during the map download according to the first condition.

10. The method of claim 3, further comprising, after performing the map download according to the second condition:
remeasuring the temperature of the memory device; and
uploading at least a part of the controller map data to the external device, when the remeasured temperature is within the low temperature range.

11. The method of claim 3, further comprising:
receiving a command, a first logical address, and a first physical address, which is mapped to the first logical address within the host map data, from the external device;
updating the controller map data by performing the map download according to the second condition, when the measured temperature is within the low temperature range;
searching the updated controller map data for a physical address, which is mapped to the first logical address, and acquiring the physical address as a second physical address from the updated controller map data; and
performing a command operation corresponding to the command on the second physical address.

12. The method of claim 3, further comprising:
receiving a command, a first logical address, and a first physical address corresponding to the first logical address from the external device;
determining whether the first physical address is valid, when the measured temperature is not within the low temperature range; and
performing a command operation corresponding to the command on the first physical address, when the first physical address is valid.

13. The method of claim 1, further comprising:
receiving a command and a first logical address from the external device, after disabling the host map data and the controller map data;
updating the controller map data by performing the map download;
searching the updated controller map data for a physical address corresponding to the first logical address, and acquiring the physical address as a second physical address from the updated controller map data; and
performing a command operation corresponding to the command on the acquired second physical address.

14. The method of claim 1, further comprising enabling the host map data and the controller map data, when the measured temperature is higher than the lowest temperature of a normal operation temperature range of the memory system.

15. The method of claim 14, further comprising:
receiving a command, a first logical address, and a first physical address corresponding to the first logical address from the external device, after the enabling of the host map data and the controller map data;
updating the controller map data by performing the map download when the first physical address is invalid;
searching the updated controller map data for a physical address corresponding to the first logical address, and acquiring the physical address as a second physical address from the updated controller map data; and
performing a command operation corresponding to the command on the acquired second physical address.

16. A memory system comprising:
a memory device suitable for storing memory map data including a logical address of an external device and a physical address of a memory device, the physical address corresponding to the logical address;
a temperature sensor suitable for measuring temperature of the memory device; and
a controller suitable for performing a map download, according to the measured temperature, on at least a part of the memory map data, and storing and managing the downloaded memory map data as controller map data, and performing a map upload on at least a part of the controller map data as host map data to the external device,
wherein when the measured temperature is lower than the lowest temperature of the normal operation temperature range of the memory system, the controller disables a part corresponding to the controller map data within the host map data and the controller map data.

17. The memory system of claim 16, wherein the controller performs the map download in response to the measured temperature.

18. The memory system of claim 17,
wherein the controller performs the map download according to a first condition of performance conditions when the measured temperature is within a normal operation temperature range of the memory system,
wherein the controller performs the map download according to a second condition of the performance conditions when the measured temperature is lower than the normal operating temperature range, and
wherein the controller performs the map download according to a third condition of the performance conditions when the measured temperature is higher than the normal operating temperature range.

19. The memory system of claim 18, wherein the controller performs the map download according to the second condition such that the number of downloads of the memory map data during the map download according to the second condition is greater than the number of downloads of the memory map data during the map download according to the first condition.

20. The memory system of claim 18, wherein the controller performs the map download according to the third condition such that the number of downloads of the memory map data during the map download according to the third condition is smaller than the number of downloads of the memory map data during the map download according to the first condition.

21. The memory system of claim 18, wherein the controller performs the map download according to the second condition such that duration of the map download according to the second condition is greater than duration of the map download according to the first condition.

22. The memory system of claim 18, wherein the controller performs the map download according to the third condition such that duration of the map download according to the third condition is shorter than duration of the map download according to the first condition.

23. The memory system of claim 18, wherein the controller performs the map download according to the second condition such that heat generated during the map download according to the second condition is greater than heat generated during the map download according to the first condition.

24. The memory system of claim 18, wherein the controller performs the map download according to the third condition such that heat generated during the map download according to the third condition is smaller than heat generated during the map download according to the first condition.

25. The memory system of claim 18, wherein when a remeasured temperature of the memory device is within the low temperature range after the map download according to the second condition, the controller further performs a map upload on at least a part of the controller map data to the external device.

26. The memory system of claim 18, wherein when a command, a first logical address and a first physical address mapped to the first logical address within the host map data are received from the external device, the controller updates the controller map data by performing the map download according to the second condition, acquires a physical address, which is mapped to the first logical address in the updated controller map data as a second physical address, and performs a command operation corresponding to the command on the second physical address.

27. The memory system of claim 16, wherein when a command and a first logical address are received from the external device after the host map data and the controller map data are disabled, the controller updates the controller map data by performing the map download, acquires a physical address corresponding to the first logical address in the updated controller map data as a second physical address, and performs a command operation corresponding to the command on the second physical address.

28. The memory system of claim 16, wherein when the measured temperature is higher than the lowest temperature of the normal operation temperature range of the memory system, the controller enables the host map data and the controller map data.

29. The memory system of claim 28, wherein when a command, a first logical address and a first physical address corresponding to the first logical address are received from the external device after the host map data and the controller map data are enabled, and the first physical address is invalid, the controller updates the controller map data by performing the map download, searches the updated controller map data for a physical address corresponding to the first logical address, acquires the physical address as a second physical address from the updated controller map data, and performs a command operation corresponding to the command on the acquired second physical address.

30. An operating method of a controller, the operating method comprising:
- downloading, from a memory device, one or more memory segments as controller segments, each of the memory segments including at least information representing a mapping relationship between a logical address and a physical address;
- uploading one or more of the controller segments to a host to store therein as host segments;
- accessing, within the memory device, a region related to the physical address, which is included in the at least information provided from the host;
- updating one or more of the host and controller segments depending on change of the physical address; and
- adjusting a time during which at least one of the downloading, uploading and updating is performed depending on temperature of the memory device to change the temperature of the memory device; and
- disabling a part of the host and controller segments, when the temperature of the memory device is lower than the lowest temperature of a normal operation temperature range of the memory system.

* * * * *